(12) United States Patent
van den Nieuwelaar et al.

(10) Patent No.: US 7,597,615 B2
(45) Date of Patent: Oct. 6, 2009

(54) METHOD AND DEVICE FOR PROCESSING A SLAUGHTER ANIMAL

(75) Inventors: Adrianus Josephes van den Nieuwelaar, Gemert (NL); Franciscus Cornelis Wilhelmus van Gaal, St. Anthonis (NL); Thomas Wilhelmus Josephus Schevers, Veghel (NL)

(73) Assignee: Stork PMT B.V. (NL)

( * ) Notice: Subject to any disclaimer, the term of this patent is extended or adjusted under 35 U.S.C. 154(b) by 0 days.

(21) Appl. No.: 12/136,603

(22) Filed: Jun. 10, 2008

(65) Prior Publication Data

US 2008/0242208 A1 Oct. 2, 2008

Related U.S. Application Data

(60) Division of application No. 11/440,972, filed on May 25, 2006, now abandoned, which is a division of application No. 11/085,690, filed on Mar. 21, 2005, now abandoned, which is a division of application No. 09/904,154, filed on Jul. 12, 2001, now Pat. No. 6,899,613, which is a continuation of application No. PCT/NL00/00024, filed on Jan. 14, 2000.

(30) Foreign Application Priority Data

Jan. 15, 1999 (NL) .................................... 1011044

(51) Int. Cl.
*A22B 7/00* (2006.01)

(52) U.S. Cl. ..................................... 452/182

(58) Field of Classification Search ............. 452/53–56, 452/163, 166, 167, 180–184, 187, 188, 194, 452/177–179
See application file for complete search history.

(56) References Cited

U.S. PATENT DOCUMENTS

| 1,118,635 | A | 11/1914 | Cassard |
| 2,129,968 | A | 9/1938 | Elmer et al. |
| 2,210,376 | A | 5/1940 | Onorato |
| 2,466,489 | A | 4/1949 | Silfen |
| 2,512,089 | A | 6/1950 | Cervin |

(Continued)

FOREIGN PATENT DOCUMENTS

DE 1177783 9/1964

(Continued)

OTHER PUBLICATIONS

International Search Report in related Application No. PCT/NL00/00024.

(Continued)

*Primary Examiner*—Thomas Price
(74) *Attorney, Agent, or Firm*—Kilpatrick Stockton LLP

(57) ABSTRACT

In a method and device for opening a blood vessel in the neck of a pre-positioned slaughter animal, a blood vessel is opened as a result of at least one cutting device being moved into the neck from one side of the neck towards the opposite side of the neck, the blood vessel being located in the path of the cutting device. The cutting device is an elongate blade which is moved in its longitudinal direction and is provided with a sharp, inclined front side. Before the blood vessel is opened, the distance between the trachea and the blood vessel is increased in an area of the opening.

7 Claims, 26 Drawing Sheets

U.S. PATENT DOCUMENTS

| | | | |
|---|---|---|---|
| 2,952,032 | A | 9/1960 | Breitkreutz |
| 3,475,785 | A | 11/1969 | Woods |
| 3,477,092 | A | 11/1969 | Simmons |
| 3,490,092 | A | 1/1970 | Harrison |
| 3,522,623 | A | 8/1970 | Pyron |
| 3,563,363 | A | 2/1971 | Harben et al. |
| 3,571,844 | A | 3/1971 | Stiles |
| 3,571,845 | A | 3/1971 | Martin et al. |
| 3,724,029 | A | 4/1973 | Lewis |
| 3,724,032 | A | 4/1973 | Harben, Jr. |
| 3,737,948 | A | 6/1973 | van Mil |
| 3,765,055 | A | 10/1973 | Lewis |
| 3,805,328 | A | 4/1974 | Strandine et al. |
| 3,833,966 | A | 9/1974 | Harben, Jr. |
| 3,967,343 | A | 7/1976 | Westervelt et al. |
| 4,011,630 | A | 3/1977 | Ochylski |
| 4,091,503 | A | 5/1978 | Fox et al. |
| 4,097,960 | A | 7/1978 | Graham et al. |
| 4,215,654 | A * | 8/1980 | Parker, Jr. .................. 119/716 |
| 4,249,285 | A | 2/1981 | Sheehan et al. |
| 4,283,813 | A | 8/1981 | House |
| 4,354,296 | A * | 10/1982 | Robinson ..................... 452/53 |
| 4,392,273 | A * | 7/1983 | De Long ...................... 452/63 |
| 4,550,473 | A | 11/1985 | Simmons |
| 4,574,427 | A | 3/1986 | Harben et al. |
| 4,615,077 | A | 10/1986 | Beebe |
| 4,625,363 | A | 12/1986 | Watson |
| 4,658,476 | A | 4/1987 | van den Brink |
| 4,894,885 | A | 1/1990 | Markert |
| 5,108,345 | A | 4/1992 | Harben et al. |
| 5,134,971 | A * | 8/1992 | Krienke et al. .............. 119/713 |
| 5,246,396 | A | 9/1993 | Schumann et al. |
| 5,269,721 | A | 12/1993 | Meyn |
| 5,273,484 | A | 12/1993 | Roger et al. |
| 5,290,187 | A * | 3/1994 | Meyn ......................... 452/178 |
| 5,334,083 | A | 8/1994 | van den Nieuwelaar et al. |
| 5,340,355 | A | 8/1994 | Meyn |
| 5,370,574 | A | 12/1994 | Meyn |
| 5,397,263 | A | 3/1995 | Schumann et al. |
| 5,425,668 | A * | 6/1995 | Martin et al. ................. 452/63 |
| 5,453,045 | A | 9/1995 | Hobbel et al. |
| 5,672,100 | A | 9/1997 | Nielsen et al. |
| 5,954,575 | A | 9/1999 | Norling |
| 5,975,029 | A | 11/1999 | Morimoto et al. |
| 6,015,339 | A | 1/2000 | Lochbrunner et al. |
| 6,033,296 | A | 3/2000 | Winkelmolen |
| 6,174,228 | B1 | 1/2001 | Grimsland et al. |
| 6,623,346 | B2 * | 9/2003 | Lee ............................. 452/53 |
| 6,716,096 | B2 * | 4/2004 | Clark .......................... 452/106 |
| 6,899,613 | B2 * | 5/2005 | van den Nieuwelaar et al. ............................. 452/63 |
| 7,134,956 | B2 * | 11/2006 | Lee ............................. 452/53 |
| 2005/0181718 | A1 | 8/2005 | van den Nieuwelaar et al. |
| 2006/0211354 | A1 | 9/2006 | van den Nieuwelaar et al. |

FOREIGN PATENT DOCUMENTS

| | | |
|---|---|---|
| DE | 245 352 A1 | 5/1987 |
| EP | 0 262 289 A1 | 4/1988 |
| FR | 2737953 | 2/1997 |
| GB | 2 083 995 | 4/1982 |
| JP | 59-192036 | 10/1984 |
| JP | 61-238611 | 10/1986 |
| WO | WO 96/16553 | 6/1996 |
| WO | WO 00/41568 A3 | 7/2000 |

OTHER PUBLICATIONS

Office Action dated Dec. 18, 2001 in parent U.S. Appl. No. 09/904,154.
Response dated Feb. 12, 2002 in parent U.S. Appl. No. 09/904,154.
Office Action dated Jun. 5, 2002 in parent U.S. Appl. No. 09/904,154.
Response dated Dec. 2, 2002 in parent U.S. Appl. No. 09/904,154.
Office Action dated Dec. 18, 2003 in parent U.S. Appl. No. 09/904,154.
Response dated Feb. 18, 2004 in parent U.S. Appl. No. 09/904,154.
Office Action dated Jun. 8, 2004 in parent U.S. Appl. No. 09/904,154.
Response dated Nov. 8, 2004 in parent U.S. Appl. No. 09/904,154.
Office Action dated Jun. 21, 2005 in parent U.S. Appl. No. 11/085,690.
Response dated Sep. 8, 2005 in parent U.S. Appl. No. 11/085,690.
Office Action dated Nov. 14, 2005 in parent U.S. Appl. No. 11/085,690.
Response dated Jan. 3, 2006 in parent U.S. Appl. No. 11/085,690.
Advisory Action dated Jan. 10, 2006 in parent U.S. Appl. No. 11/085,690.
Office Action dated Mar. 28, 2006 in parent U.S. Appl. No. 11/085,690.
Response dated Aug. 24, 2006 in parent U.S. Appl. No. 11/085,690.
Office Action dated Oct. 26, 2006 in parent U.S. Appl. No. 11/085,690.
Office Action dated Aug. 10, 2006 in parent U.S. Appl. No. 11/440,972.
Office Action dated Sep. 8, 2006 in parent U.S. Appl. No. 11/440,972.
Response dated Oct. 6, 2006 in parent U.S. Appl. No. 11/440,972.
Office Action dated Oct. 18, 2006 in parent U.S. Appl. No. 11/440,972.
Response dated Nov. 13, 2006 in parent U.S. Appl. No. 11/440,972.
Office Action dated Dec. 22, 2006 in parent U.S. Appl. No. 11/440,972.
Response dated May 21, 2007 in parent U.S. Appl. No. 11/440,972.
Office Action dated Aug. 27, 2007 in parent U.S. Appl. No. 11/440,972.
Notice of Allowance dated Mar. 11, 2008 in parent U.S. Appl. No. 11/440,972.
Response dated Jun. 10, 2008 re parent U.S. Appl. No. 11/440,972.

* cited by examiner

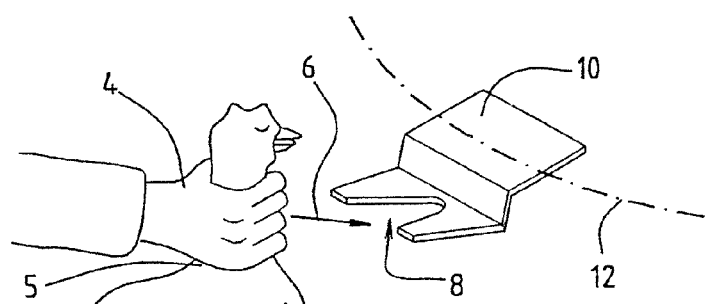
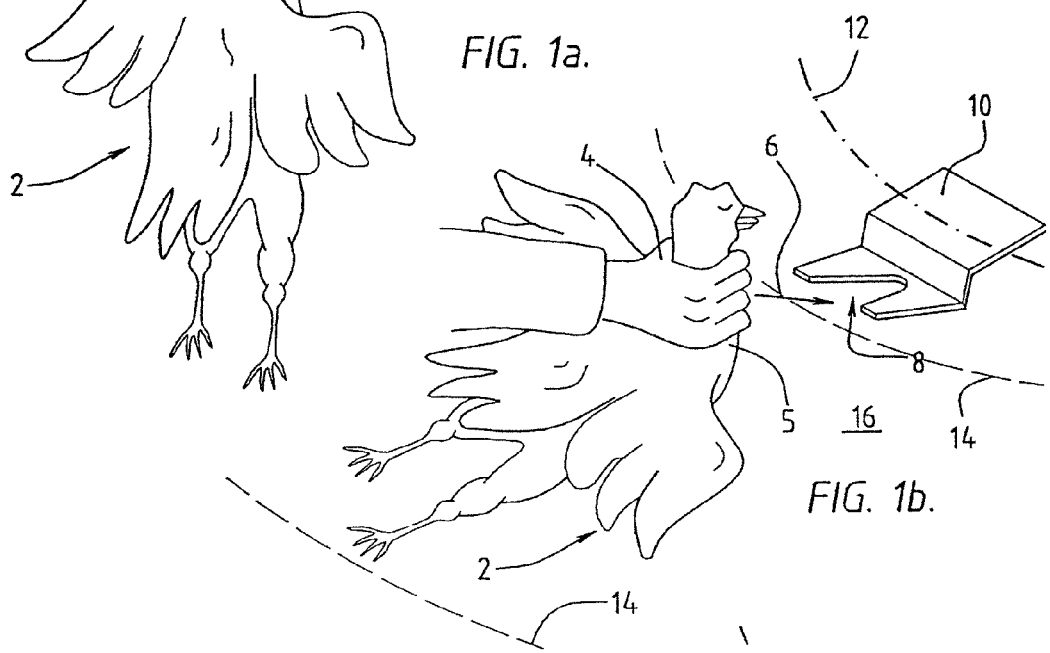
FIG. 1a.
FIG. 1b.
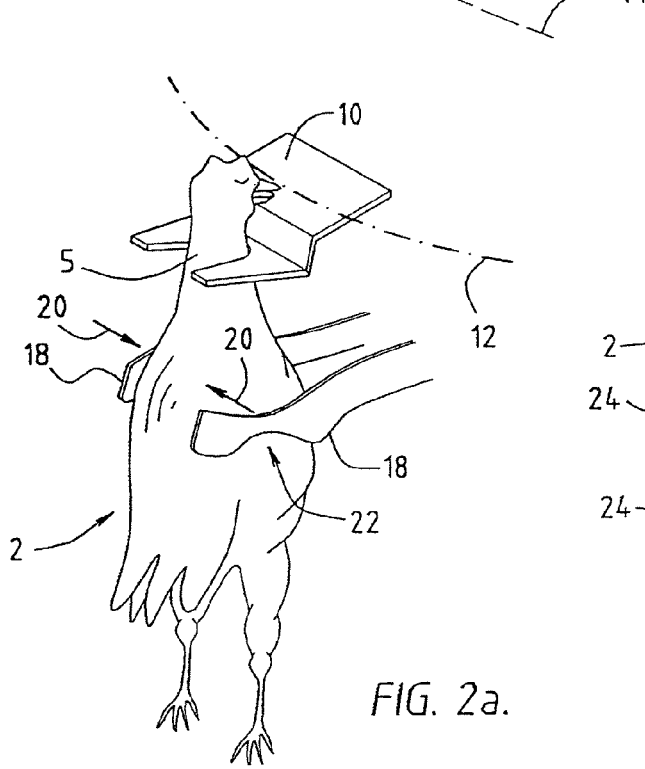
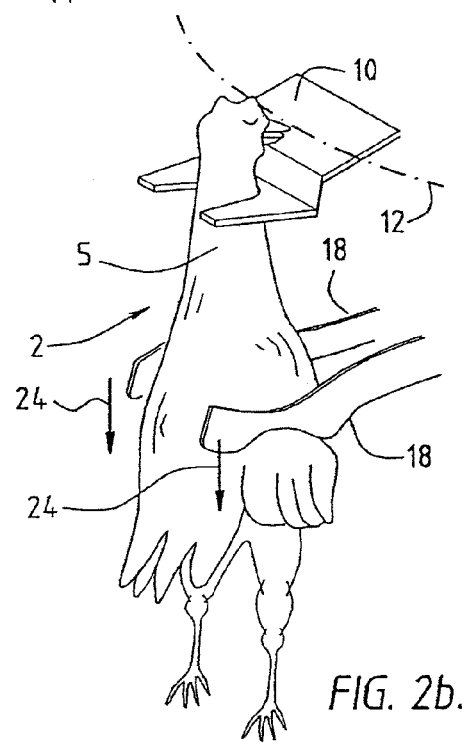
FIG. 2a.
FIG. 2b.

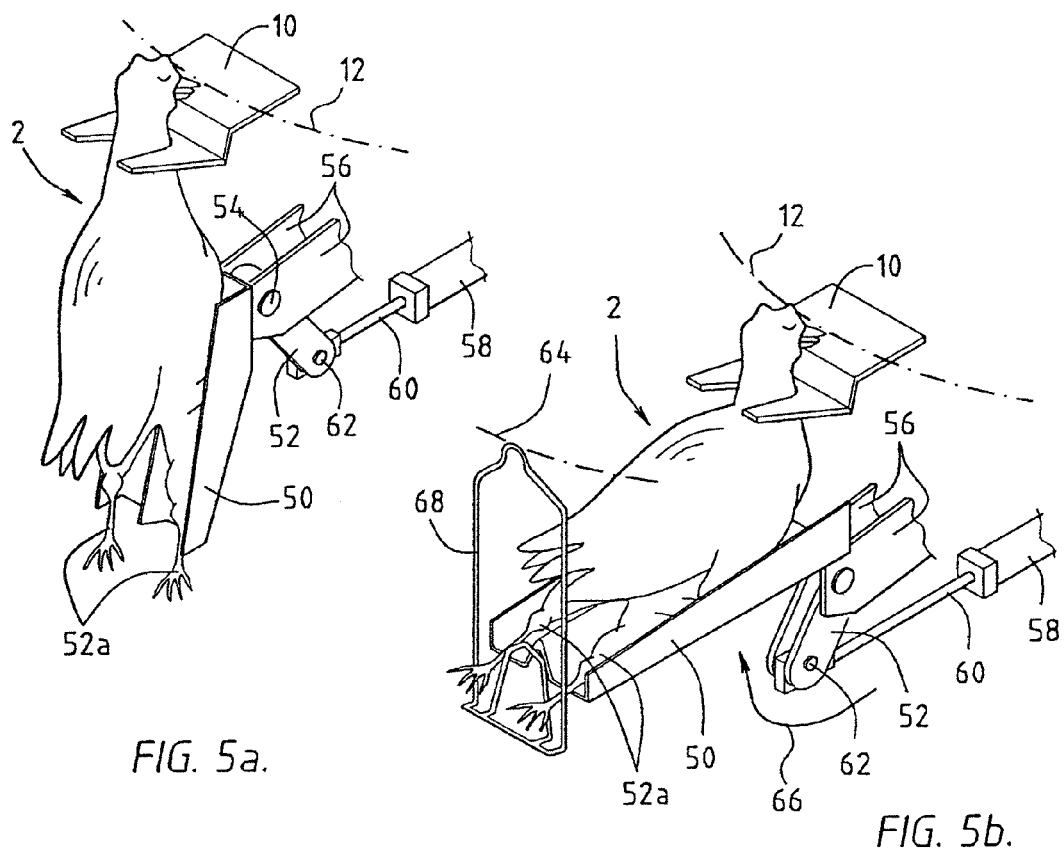
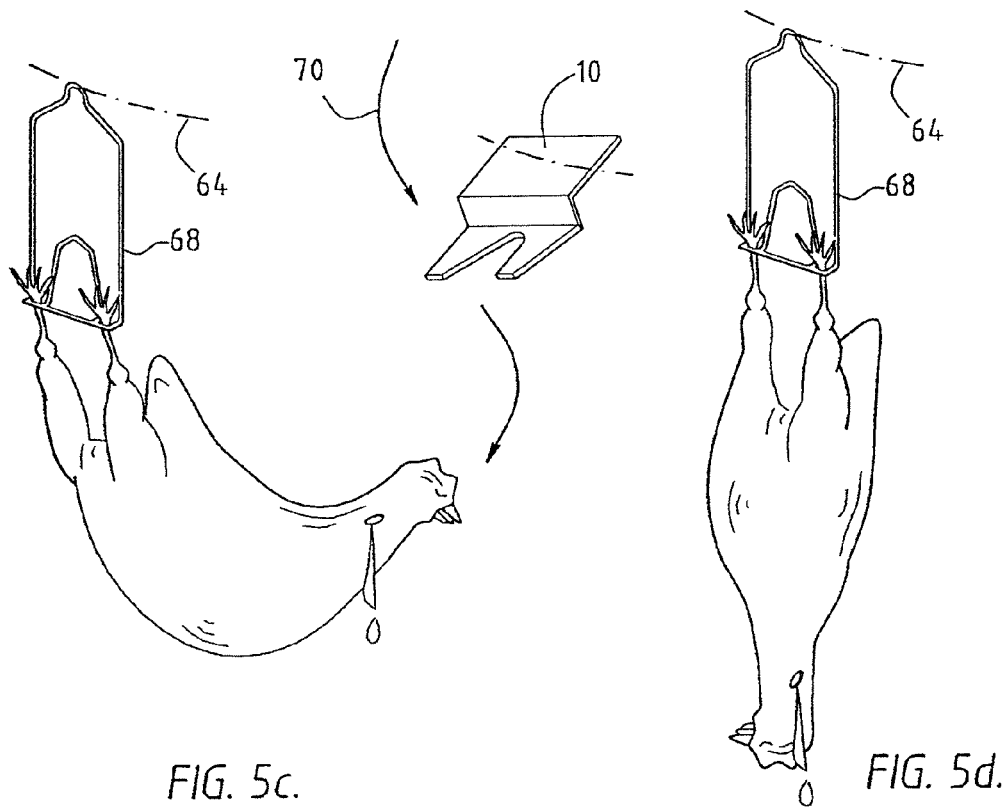
FIG. 5a.
FIG. 5b.
FIG. 5c.
FIG. 5d.

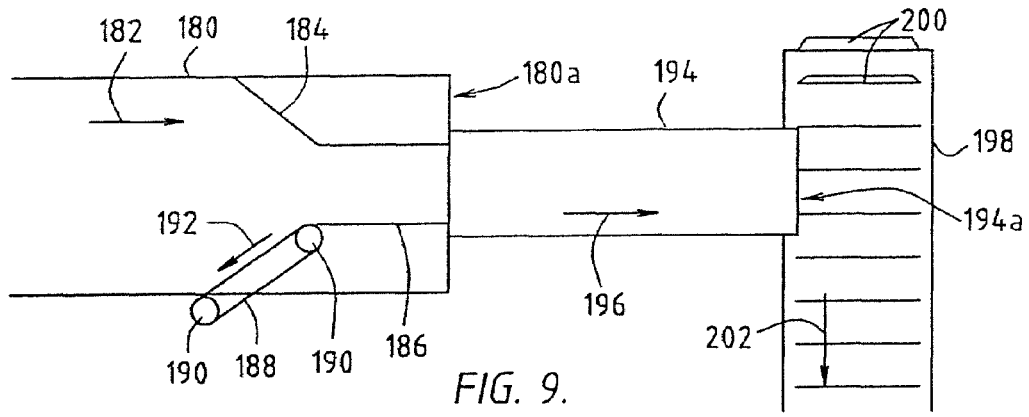
FIG. 9.
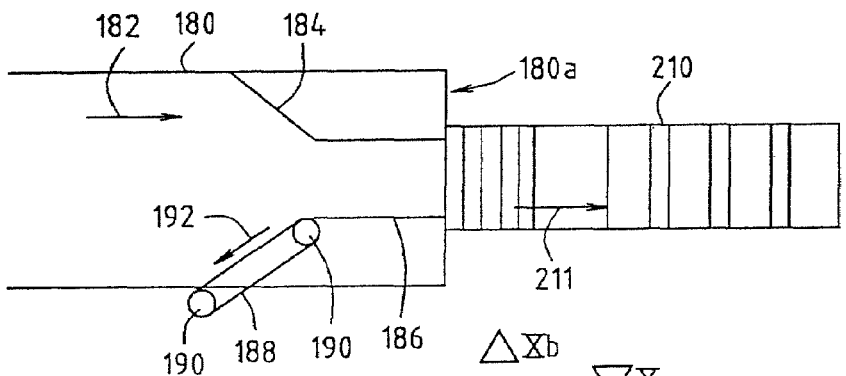
FIG. 10a.
FIG. 10b.
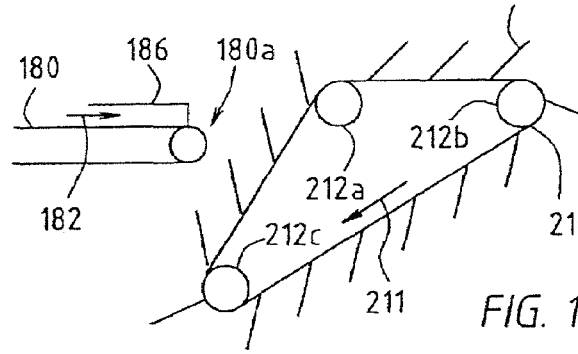
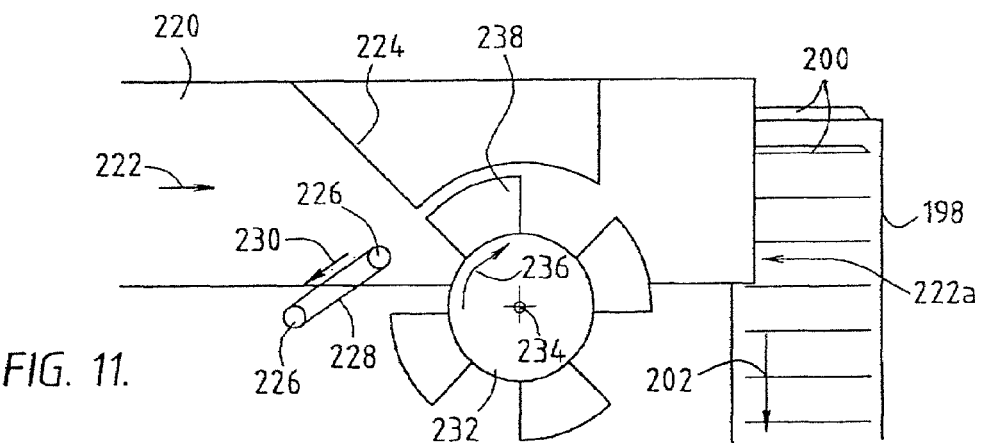
FIG. 11.

METHOD AND DEVICE FOR PROCESSING A SLAUGHTER ANIMAL

CROSS-REFERENCE TO RELATED APPLICATIONS

This application is a division of U.S. patent application Ser. No. 11/440,972 filed on May 25, 2006 now abandoned, which is a division application of U.S. Ser. No. 11/085,690 filed on Mar. 21, 2005, now abandoned, which is a divisional application of U.S. patent application Ser. No. 09/904,154 filed on Jul. 12, 2001, now U.S. Pat. No. 6,899,613, which is a continuation application of PCT/NL/00/00024 filed on Jan. 14, 2000 which claims priority to Netherlands Application No. 1011044 filed on Jan. 15, 1999, the contents of which are incorporated by reference herein.

FIELD OF INVENTION

This invention relates to methods and devices for processing a slaughter animal, such as a fowl.

This processing relates firstly to the mechanical opening of at least one blood vessel in the neck of a slaughter animal, in particular a fowl, comprising the steps of: positioning the neck of the slaughter animal; and opening the at least one blood vessel.

BACKGROUND OF THE INVENTION

When slaughtering animals, such as cattle, small livestock and poultry, it is customary, after the animal has been stunned or killed, to open one or more important blood vessels and to allow the blood to run out of the animal. The blood vessel which is to be opened is usually the carotid artery. In order to ensure that the blood runs out of the animal as fully as possible, it is moved into a position which is such that the sticking location is located at a lower level than most of the rest of the body of the animal. In specific terms, this usually means that the animal is hung by at least one leg, in particular—other than in the case of poultry—by at least one hind leg.

In the case of animals which have been stunned electrically or with the aid of a gas atmosphere, a heart beat, muscle reactions and a pump action are still present in the blood vessels sometime after sticking, and all these actions promote exsanguination of the slaughter animal. In the case of animals which are already substantially dead before the blood vessels are opened, the heart beat, muscle reactions and pump action in the blood vessels are substantially absent, so that apart from the external application of pressure to the body of the animal, it is only possible to use the force of gravity for the exsanguination process.

In the case of stunned animals, but even more so in the case of dead animals (owing to the corporeal functions which are then absent), it is important for the blood vessels to be opened as fully as possible. The current state of the art includes various devices which can be used to open the blood vessels in the neck of poultry.

European Patent No. 262,289 describes a device in which a fowl which is hung by its legs is moved onwards. The neck of the fowl is fixed between two substantially fork-like supports, the limbs of the supports being directed towards one another. While the neck of the poultry is being fixed in place, a double blade, which is provided with a substantially U-shaped recess, is stuck into the neck at the front side of the neck, transversely with respect to the longitudinal direction of the neck, with the result that the two carotid arteries are opened. The U-shaped recess is intended to prevent the blade from damaging the cervical vertebrae, the oesophagus or the trachea in the neck of the poultry.

U.S. Pat. Nos. 4,354,296 and 5,425,668 describe opening a jugular vein of poultry with the aid of a rotating blade at the side of the neck and with the aid of a device in which the poultry is moved onwards hanging by its legs.

U.S. Pat. No. 4,392,273 describes a device in which the head of poultry which is suspended by its legs and moved onwards by the device is trapped between two parallel, helical and rotating guides, which are provided, on their outlet side, with blades which are directed towards one another, for opening the jugular veins at the sides of the neck.

A problem which arises in particular when dead animals are being exsanguinated with the aid of the force of gravity is presented by the inaccessibility of the arteries in the neck when using the conventional methods of opening blood vessels with the aid of a rotating blade. The arteries are located relatively far from the surface of the neck, and to achieve optimum exsanguination of the slaughter animal, should also be opened in addition to the veins. However, with the conventional means this is impossible without also cutting into or severing the oesophagus and/or the trachea. This is sometimes undesirable, since in a later stage of the processing of the slaughter animal it is often necessary for the connections between the head of the slaughter animal and its body, which are formed in particular by the trachea and the oesophagus, to be intact, so that these connections can be pulled out at the head, and any organs which are joined to them can be pulled out of the body of the slaughter animal.

Another problem in the prior art is the fact that opening a blood vessel in the neck of a slaughter animal which is hung by a (hind) leg immediately causes a large amount of blood to emerge from the neck, which blood contaminates the device used for opening to a considerable extent. To combat the negative consequences of this contamination, such as bacterial infection, continuous, intensive cleaning of the device is required.

SUMMARY OF THE INVENTION

An object of the method according to the invention is to reduce or eliminate the abovementioned drawbacks.

To reach this object, in the method according to the invention a blood vessel is opened by moving at least one cutting means into the neck from one side of the neck towards the opposite side of the neck, the at least one blood vessel to be opened being located in the path of the cutting means. The cutting means may be a blade or, for example, a water jet. In particular, the cutting means is a substantially elongate blade which is provided with a sharp, inclined front side, the blade is moved substantially in its longitudinal direction, the at least one blood vessel which is to be opened being located in the path of the inclined side of the blade. Preferably, the blade is moved to and fro substantially along a line. The method according to the invention thus provides the possibility of opening, i.e. cutting into or severing, both the (major) jugular veins (V. jugularis) and the deeper carotid arteries (A. carotis) by a single movement of the blade.

To prevent the equipment which is used to open a blood vessel in the neck of the slaughter animal from being excessively contaminated with blood, the slaughter animal is preferably killed, in particular in a gas atmosphere, before the blood vessel is opened, and the slaughter animal is expediently positioned in such a manner that the head is located at a higher level than the area of the opening and the body is located at a lower level than the area of the opening. Due to the absence of the heart beat, muscle reactions and pump action in the blood vessels of the dead slaughter animal, the pressure of the blood in the blood vessel at the location of the opening is low, partly due to the position of the slaughter animal. Consequently, only a small quantity of blood emerges from the body of the slaughter animal at the location of the opening.

When the slaughter animal is then positioned in such a manner that its body is located at a higher level than the area of the opening, which can take place at a location which is completely adapted to collect the blood emerging from the opened blood vessel, the equipment used to open the blood vessel remains relatively clean. A slaughter animal which has been killed in a gas atmosphere is relatively relaxed, which promotes exsanguination.

Obviously, the body of the slaughter animal may already have been positioned at a higher level than the area of the opening before the at least one blood vessel is opened. Furthermore, it should be noted here that the advantage of the relatively low blood pressure in the neck of the slaughter animal if the body is at a lower level than the position of the opening is used not only if the slaughter animal is dead, but also if the slaughter animal is alive, after it has or has not been stunned.

Preferably, before the at least one blood vessel is opened, the distance between the trachea and the at least one blood vessel is increased in an area of the opening. Moving the blood vessel and the trachea apart in the area of the opening creates space which allows the blood vessel to be opened with a cutting means without there being any risk of the cutting means damaging the trachea in an undesirable manner. The connection between the head and the body of the slaughter animal via the trachea therefore remains completely intact.

If before the at least one blood vessel is opened, the distance between the oesophagus and the blood vessel is also increased in the area of the opening, the oesophagus can also be held outside the working area of the cutting means which opens the at least one blood vessel, and the connection between the body and the head of the slaughter animal which is formed by the oesophagus also remains completely intact.

Imposing a distance between the blood vessel, on the one hand, and the trachea, as well as the oesophagus if appropriate, on the other hand, also makes the blood vessel more accessible to a cutting means: it can then be opened not only from the side directed towards the lateral side of the neck, but also from the side directed towards the front side of the neck. In addition, the arteries of the neck are also more accessible to a cutting means when using the method according to the invention.

In a preferred embodiment of the method according to the invention, the distance between the trachea and, if appropriate, the oesophagus, on the one hand, and the blood vessel, on the other hand, is increased by introducing a separating member, which is provided with an end, into the neck from each of the two sides of the neck until the ends of the two separating members come into contact with one another or are at a short distance from one another at a location between the trachea and the at least one blood vessel, in particular at a location between the oesophagus and the at least one blood vessel, and then moving the separating members and a part of the neck apart substantially transversely with respect to the longitudinal direction of the neck. The separating members separate the neck, in the area of the opening, into two parts, as it were, in particular a front part and a rear part. Of course, said distance is adapted to the desired conditions and can be achieved as a result of the separating members being displaced with respect to (a part of) the neck, as a result of (a part of) the neck being displaced with respect to the separating members, or as a result of the separating members and (a part of) the neck being moved apart. The first option is preferred, in which case in particular the separating members, after they have been moved into the neck, are moved towards the front side of the neck. In this case, the separating members carry the trachea, or the trachea and the oesophagus, with them towards the front side of the neck, an operation which, due to the flexibility of said organs, is easily possible without significantly changing the location of the remaining part of the neck containing the at least one blood vessel and the cervical vertebrae. The ends of the separating members may engage either behind an oesophagus or trachea or on an oesophagus or trachea, for displacing the oesophagus or trachea with respect to a blood vessel which is to be opened.

The device for cutting into at least one blood vessel in the neck of a slaughter animal comprises: neck positioning means for positioning the neck of the slaughter animal; and blood vessel opening meals for opening the at least one blood vessel, and is wherein the blood vessel opening means comprise at least one cutting means which is adapted to move through the neck from one side of the neck to the other side of the neck, the at least one blood vessel which is to be opened being located in the path of the cutting means.

In a preferred embodiment, separating means are provided for increasing the distance between the trachea and the at least one blood vessel in an area where the cutting takes place, as explained above.

In a preferred embodiment, the separating means, which preferably comprise the separating members described above, have a blunt end, in order to prevent damage to the trachea and/or the oesophagus when the separating members are introduced into the neck. In this way, the neck tissue of the neck of the slaughter animal is only pushed aside by the separating members, tearing at a desired location.

To achieve a good, reproducible action of the separating means, neck-positioning means are preferably provided for positioning the neck of the slaughter animal in the device according to the invention. Preferably, the neck positioning means act in the vicinity of at least one end of the neck, and more particularly they engage on the neck in the area which extends from the underside of the head of the slaughter animal to the second cervical vertebra. The neck positioning means may comprise a head support for supporting the head and a shoulder support for supporting the shoulders of the slaughter animal. The head support is advantageously at the same time a head carrier for carrying the slaughter animal by its head, this head carrier comprising a substantially U-shaped carrying opening, the transverse dimension of which is smaller than the width of the head of the slaughter animal, so that the slaughter animal can easily be hung from the head carrier. This can be achieved with very little effort, by manipulating only the head, and not the body, of the slaughter animal, at a location where stunned or dead slaughter animals are supplied, lying on a surface. If it is ensured that the head carrier forms part of a conveyor, the slaughter animal can be guided onwards automatically to and past the separating means and the blood vessel opening means.

To allow the slaughter animal, which is hanging by its head, to be exsanguinated as fully as possible after a blood vessel in its neck has been opened, the body has to be moved to a higher level than the opening location, by shifting the point by which the slaughter animal is hung from the head to the legs. For this purpose, it is expedient to provide leg positioning means for placing at least one leg or hind leg of the slaughter animal in a leg carrier, such as a conventional hook, which interacts with the leg positioning means.

In a preferred embodiment, the leg positioning means comprise a support which can tilt about an axis, for tilting at least part of at least one leg from a substantially vertical position into a substantially horizontal position. Said part of the leg preferably extends below the knee joint and, for poultry, is in particular the drumstick. In the horizontal position of the leg, the latter can easily be moved through an opening in the leg carrier, after which the leg can be fixed in the leg carrier, and the slaughter animal need no longer be hung by its head, so that the body of the slaughter animal moves to a higher level than the location where a blood vessel has been opened.

In a further preferred embodiment, the tiltable support is adapted also to support the breast of the slaughter animal, so that tilting of the at least one leg of the slaughter animal can be controlled better. The support may be provided with gripper means, such as mechanically controlled gripper fingers, for securely gripping the at least one leg.

To ensure reliable interaction between the leg positioning means and the leg carrier, it is expedient to provide one or more stops, which interact with the leg positioning means and act on the slaughter animal, for positioning the at least one leg substantially in a horizontal plane.

The processing in the context of the invention also relates to imposing a distance between stunned and dead slaughter animals, orienting stunned or dead slaughter animals, and manually or automatically picking up stunned or dead slaughter animals and hanging them from hooks.

Other objects, features and advantages of the present invention will become apparent from the following detailed description in conjunction with the appended drawings in which identical components or components with a similar function are denoted by the same reference symbols.

BRIEF DESCRIPTION OF THE DRAWINGS

FIG. 1a shows a perspective view of how a fowl is hung from a hook;

FIG. 1b shows a perspective view of an alternative way of hanging a fowl from a hook;

FIGS. 2a and 2b show how the neck of the fowl is fixed and positioned;

FIGS. 5a, 5b, 5c and 5d show perspective views of successive steps involved in transferring the fowl from a position in which it is hung by its head to a position in which it is hung by its legs;

FIG. 9 shows a diagrammatic, plan view of a second device for imposing a distance between stunned or dead slaughter animals;

FIGS. 10a and 10b respectively show a plan view and a side view, in diagrammatic form, of a third device for imposing a distance between stunned or dead slaughter animals;

FIG. 11 shows a diagrammatic plan view of a fourth device for imposing a distance between stunned or dead slaughter animals;

DESCRIPTION OF THE PREFERRED EMBODIMENTS

Figure 3D:
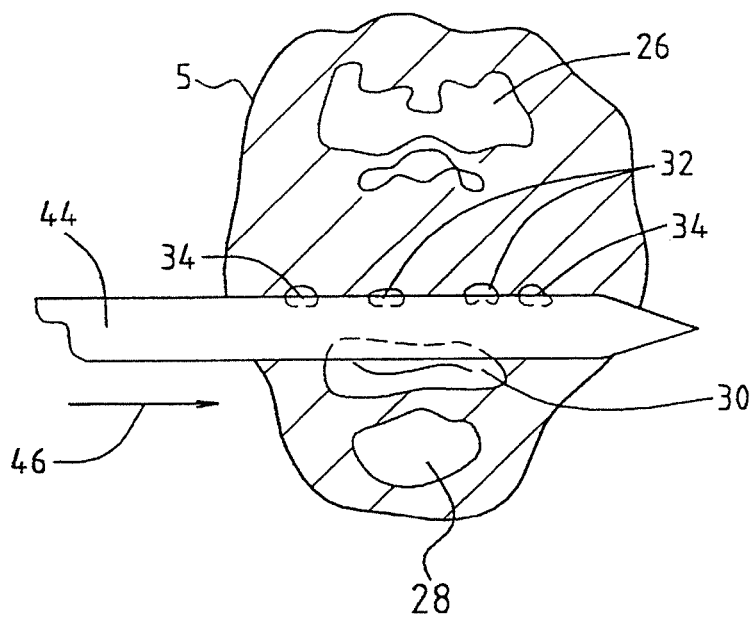
FIG. 3d shows, on a further enlarged scale, an alternative processing step involved in opening blood vessels in the neck of the fowl.

FIG. 1a shows a stunned or dead fowl 2 which a hand 4 of a person (not shown in more detail) is carrying by its neck 5. The neck 5 of the fowl 2 is moved into a recess 8 of a hook 10, in the direction of the arrow 6, for hanging the fowl from the hook 10 by its head. The hook 10 may be stationary or may form part of a preferably endless conveyor, which is not shown in more detail, and moves along a path which is denoted by a dot-dashed line 12. The path 12 may be either curved or straight. The hook 10 can not only be conveyed along the path 12, but also can be tilted about an axis which runs parallel to the path 12.

As shown in FIG. 1b, the fowl 2 may also be moved into the recess 8 of the hook 10 with the aid of the hand 4 from a lying position on a surface 16 which extends between the dashed lines 14 illustrated. The surface 16 may be the base of a crate or a compartment of a crate, but may also, for example, be a belt of a moving belt conveyor.

Figure 1C:
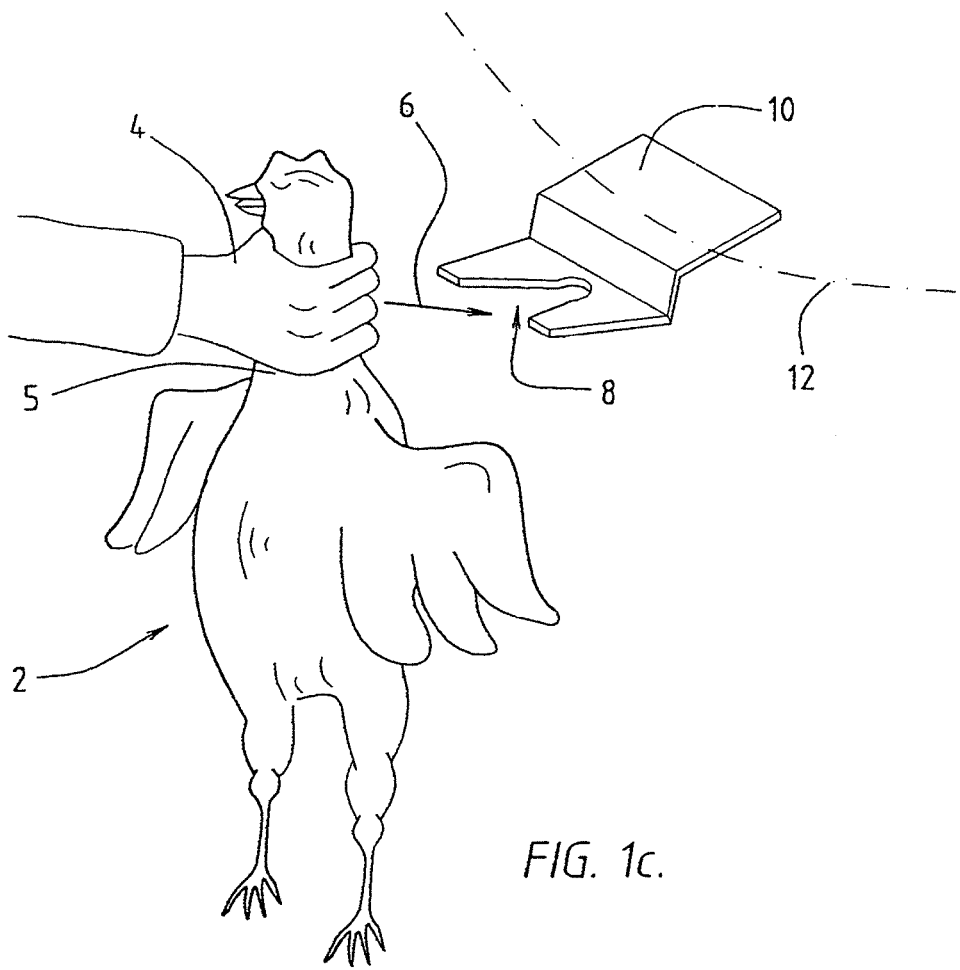
FIG. 1c shows a perspective view of yet another way of hanging a fowl from a hook.

It is in principle irrelevant for the method and device according to the invention whether the fowl is hung from the hook 10 with its beak facing towards the recess 8 or away from the recess, as shown in FIG. 1c. However, the position of the fowl may have consequences for the positioning of the tools, such as the separating members which will be discussed in more detail below with reference to FIGS. 3a-3c.

After the fowl has been hung by its head in the recess 8 of the hook 10, as explained with reference to FIGS. 1a and 1b, shoulder supports 18 are moved in a manner which is not shown in more detail onto either side of the fowl 2, as illustrated in FIG. 2a, towards the neck 5 of the fowl, in the direction of arrows 20. If the hook 10 moves along the path 12, the shoulder supports 18, in addition to the movement in the direction of arrows 20, will move synchronously with the hook 10. The shoulder supports 18 come into contact with the fowl 2 in the area of the neck 5, with their concave sides 22 located above the shoulders of the fowl 2.

Then, as illustrated in FIG. 2b, the shoulder supports 18 are moved away from the hook 10, in the direction of arrows 24, during which movement the sides 22 of the shoulder supports 18 come to bear against the shoulders of the fowl 2 and push them downwards. Thus, the neck 5 of the fowl 2 is reproducibly moved into a predetermined position, with the neck 5 under a tensile stress, as seen in its longitudinal direction.

FIGS. 3a, 3b, 3c and 3d show a cross section through the neck of a fowl, illustrating a spinal column 26, trachea 28, oesophagus 30, two arteries (*A. carotis*) 32 and two (major) veins (*V. jugularis*) 34.

Figure 3A:
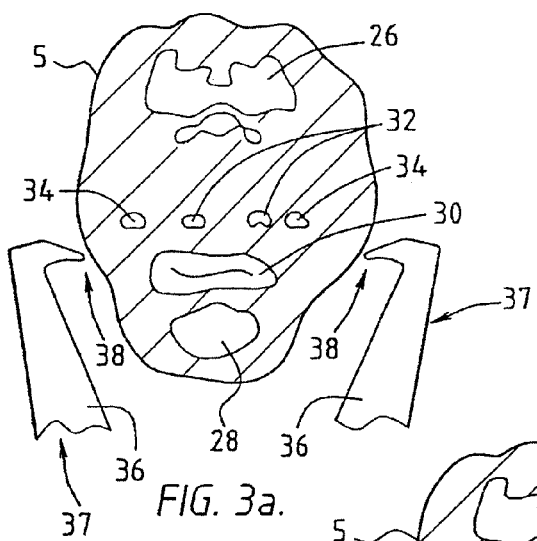
FIGS. 3a, 3b and 3c show, on an enlarged scale, various processing steps involved in opening blood vessels in the neck, the neck being illustrated in cross section a short distance below the head of the fowl.

As shown in FIG. 3a, separating members 36 which have arms 37 and a blunt, hook-shaped end 38 are arranged on either side of the neck 5. In a similar way to the shoulder supports 18, the separating members 36 can move synchronously with the hook 10 and, additionally, execute autonomous movements, in a manner which is not shown in more detail and as will be explained further with reference to FIGS. 3b and 3c.

Figure 3B:
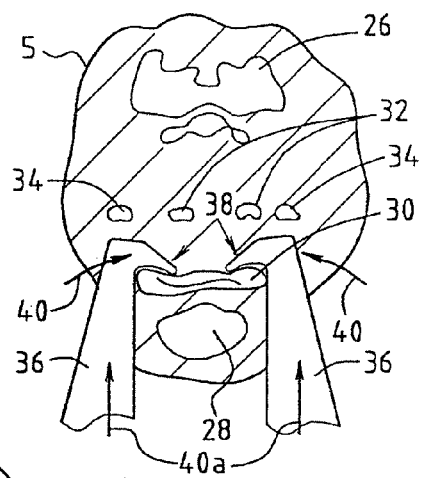

FIG. 3b shows the situation in which the separating members 36 have moved into the neck 5 in the direction of arrows 40 until the ends 38 of the separating members 36 are located at a short distance apart. The ends 38 have been moved into the neck from the mutually opposite sides of the neck 5 at a location which is such that they are situated between the oesophagus 30 and the blood vessels 32 and 34. It is also possible for the separating members 36 to be moved into the neck substantially in the direction indicated by arrows 40a.

Figure 3C:
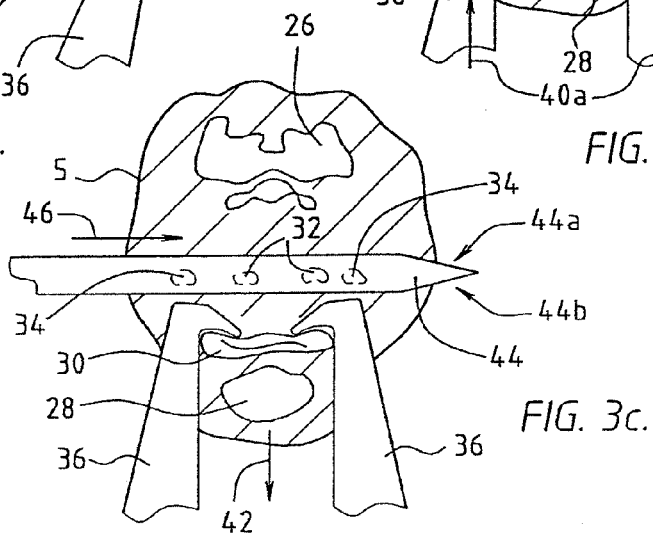

As shown in FIG. 3c, the separating members 36 are moved out of the position shown in FIG. 3b in the direction of arrow 42, for moving the trachea 28 and the oesophagus 30 to a distance from the blood vessels 32 and 34. Then, an elongate blade 44 is moved through the neck 5 in the direction of arrow 46, so that all the important blood vessels 32 and 34 in the neck 5 are opened. For this purpose, the blade 44 is provided with sharp, inclined sides 44a and 44b. The trachea 28 and the oesophagus 30 remain intact.

It should be noted that the separating members 36 do not have to act/move in the same plane as the blade 44. Also, the arms 37; of the separating members 36 may extend in a different direction from that shown in FIGS. 3a-3c.

If it is not important for the oesophagus 30 and, if appropriate, the trachea 28 to remain intact when the blood vessels 32 and 34 are opened, or if it is even desirable for the oesophagus 30 and, if appropriate, the trachea 28 also to be cut into, the separating members 36 are not used, and a suitable width of blade 44 is used, as illustrated in FIG. 3d.

Figure 4A:
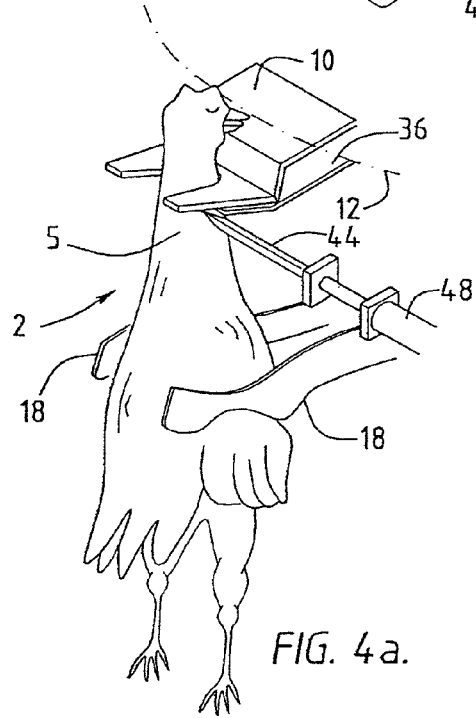
FIGS. 4a and 4b show perspective views of the position and action of tools for carrying out the method steps illustrated in FIGS. 3a-3c.
Figure 4B:
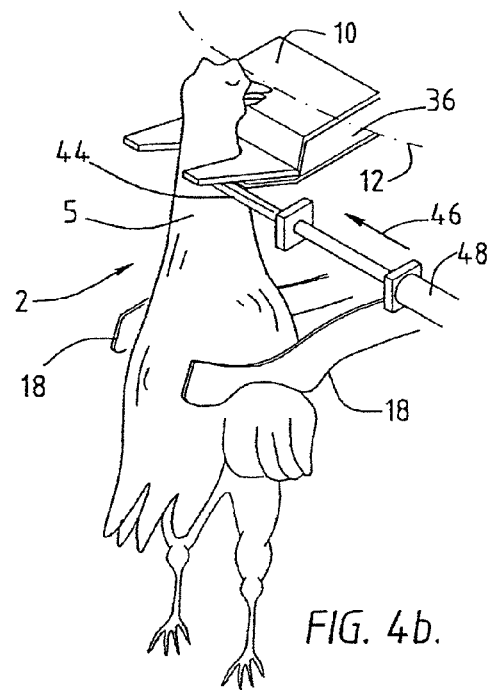

FIGS. 4a and 4b illustrate the position of the separating members 36 and the blade 44 with respect to the neck 5 of the fowl 2. If the hook 10 is moving along the path 12, not only the shoulder supports 18 and the separating members 36, but also the blade 44, irrespective of their autonomous movements, will move synchronously with the hook 10. The movement of the blade 44 is brought about with the aid of a piston-cylinder unit 48.

Figure 4C:
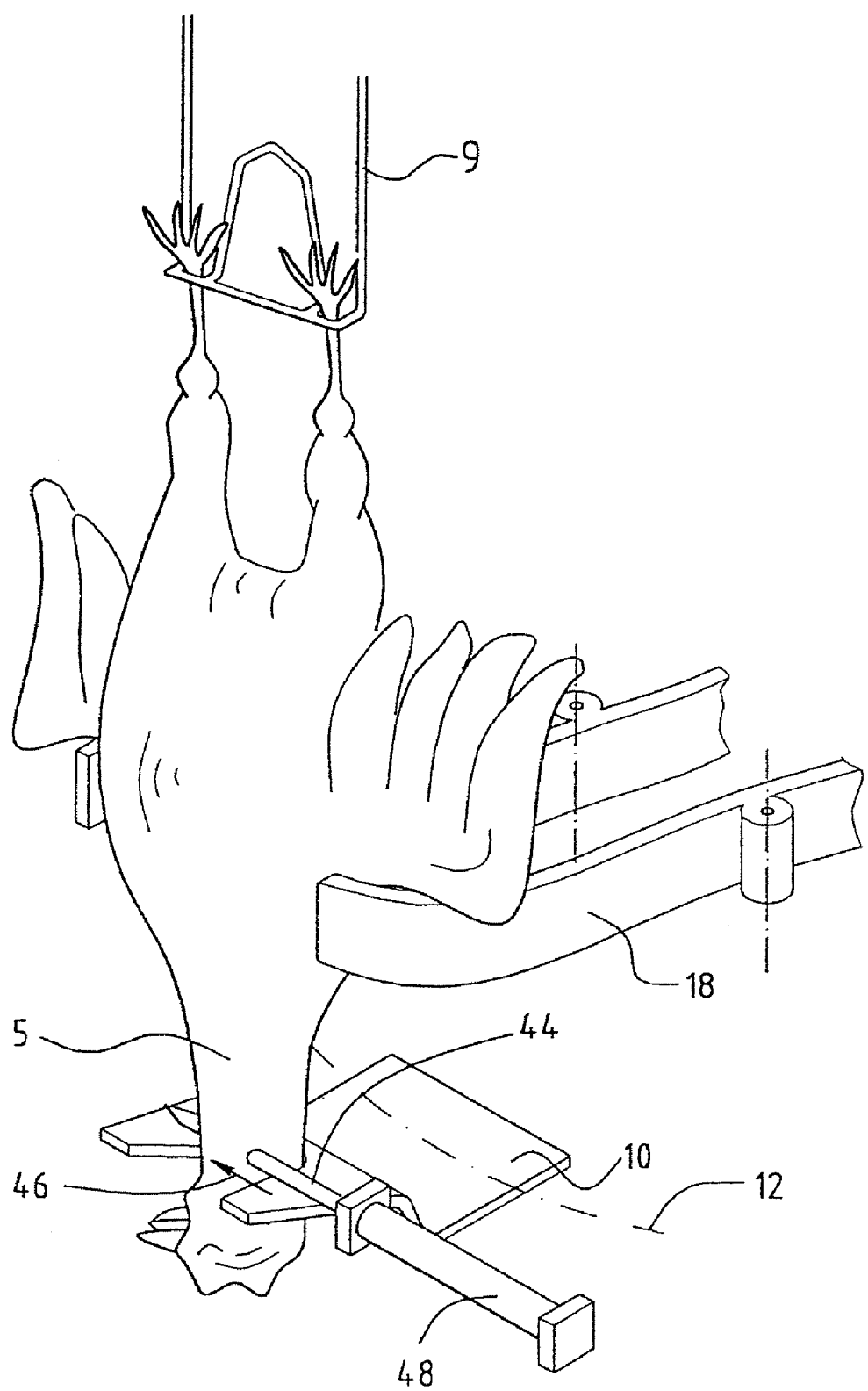
FIG. 4c shows a perspective view of the position and action of tools for opening blood vessels in the neck of a fowl which is in an alternative position.

Obviously, it is also possible for the fowl, in order to carry out the operations shown in FIGS. 2a, 2b, 3a-3d, 4a and 4b, to be hung by its legs from a hook 9, as shown in FIG. 4c. In this position too, suitable tools corresponding to FIG. 2b can be used to tension and position the neck of the fowl, and an incision can be made as shown in FIGS. 3a-3d, 4a and 4b. In the case shown in FIG. 4c, the fowl will be exsanguinated immediately after the blood vessels in the neck have been opened.

After the blood vessels have been opened in the manner described above with reference to FIGS. 4a and 4b, the body of the fowl is moved to a higher level than the location of the opening, in the manner which is to be explained with reference to FIGS. 5a, 5b, 5c and 5d. For this purpose, as shown in FIG. 5a, a double leg support 50 is arranged against the legs 52a of the fowl 2. The leg support 50 moves synchronously with the hook 10 and parallel to the path 12 if the hook 10 is moving. The leg support 50 is attached to an arm 52 which is mounted in such a manner that it can pivot about a pin 54 in supports 56. A piston-cylinder unit 58, of which a piston rod 60 is pivotably coupled to the arm 52 at the location of a pin 62, is arranged substantially in a fixed position with respect to the supports 56.

In the stage illustrated in FIG. 5b, the leg support has been pivoted upwards, in the direction of arrow 66, through approximately 90° as a result of the actuation of the piston-cylinder unit 58, so that the legs 52a project substantially horizontally outside the leg support 50. Previously, a double hook 68 has been positioned in such a manner that the legs 52a project into an opening which is delimited by the hook

68. The hook 68 may, for example, be moved synchronously with the hook 10, along a path 64, by means of a conveyor.

As illustrated in FIG. 5*c*, the hook 10 is then tilted in the direction of the arrow 70, and the leg support 50 is removed, with the result that the legs 52*a* slip into designated recesses in the hook 68, and the fowl 2 then hangs in the position illustrated in FIG. 5*d*. In this position, the corporeal functions (where still present) and the force of gravity ensure that the fowl is exsanguinated.

It is not essential for the beak of the fowl to face towards the hook 10 as shown in FIGS. 1*a*, 1*b*, 2*a*, 2*b*, 4*a*, 4*b*, 5*a* and 5*b*; in principle, the beak may also be directed away from the hook 10, as indicated in FIGS. 1*c* and 4*c*, or may adopt yet a further position, provided that the (positions of the) shoulder supports, the separating members, the blade and the leg support are correspondingly adapted.

Figure 6A:
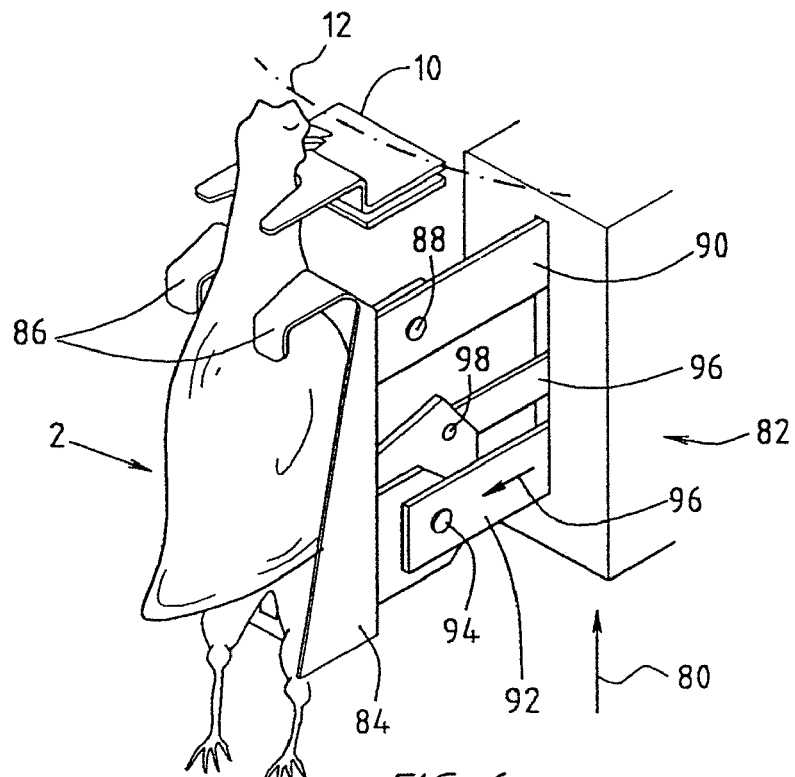
FIGS. 6a, 6b and 6c show perspective views of alternative successive steps involved in transferring the fowl from a position in which it is hung by its head to a position in which it is hung by its legs.
Figure 6B:
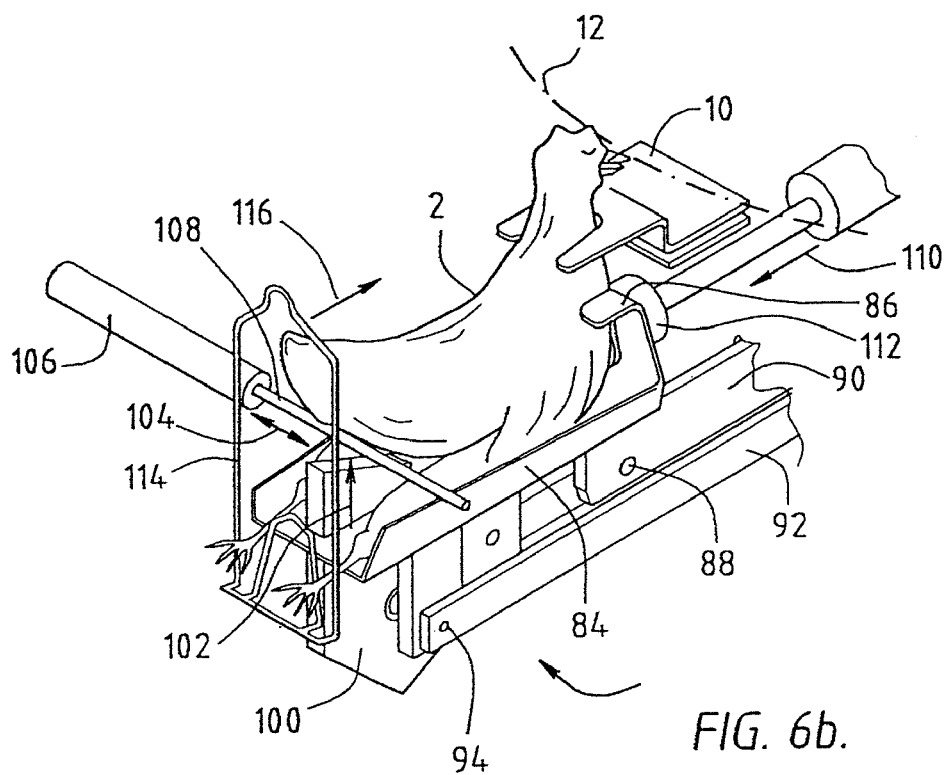
Figure 6C:
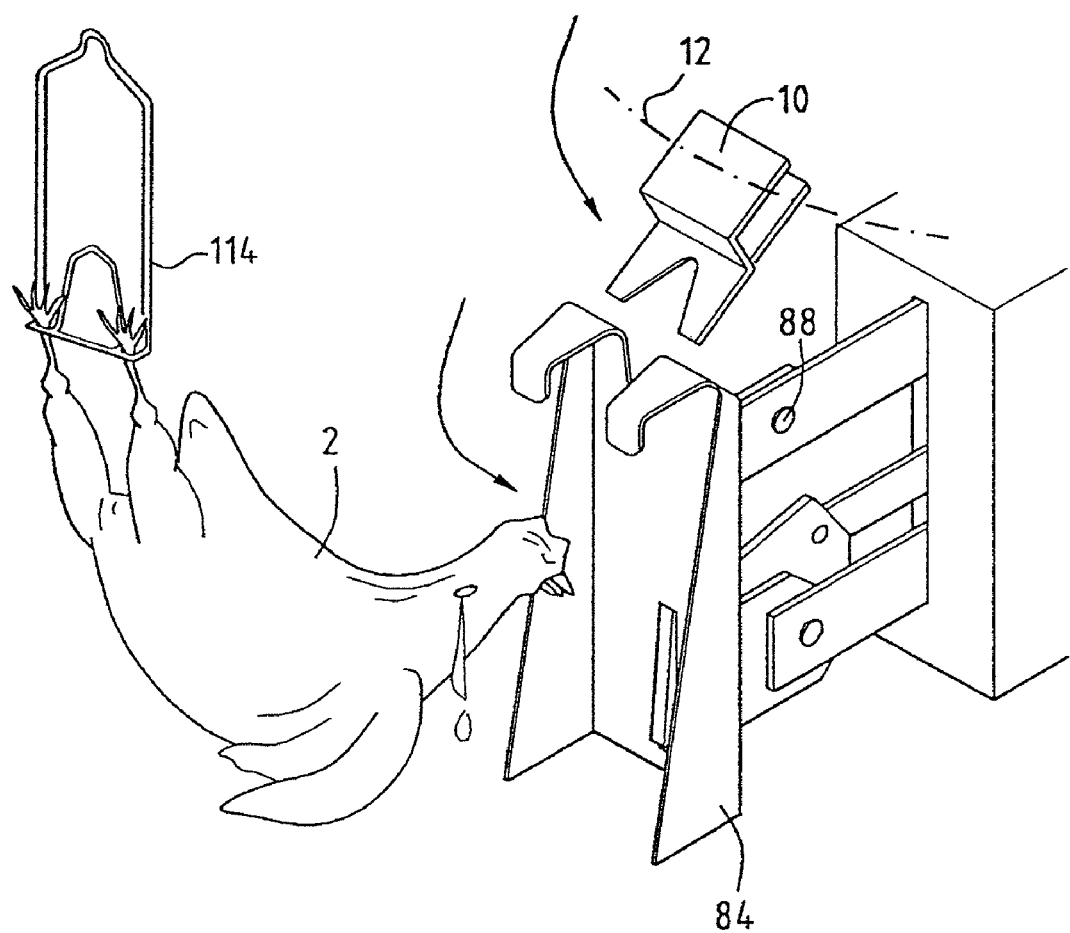

FIGS. 6*a*, 6*b* and 6*c* show a part of a device for moving the body of a fowl to a higher level than a cut which has been made in the neck of the fowl. As shown in FIG. 6*a*, a unit 82 is moved towards the fowl 2 substantially in the direction of arrow 80. The unit 82 comprises a combined breast/leg support 84 with shoulder supports 86, and is attached to an arm 90 in such a manner that it can tilt about a pin 88. The support 84 is tilted as a result of an arm 92, which is connected to the support 84 in such a manner that it can pivot about a pin 94, being moved in the direction of arrow 96. In this way, the fowl 2 is moved into a position which is illustrated in FIG. 6*b*.

In the position of the fowl 2 which is illustrated in FIG. 6*b*, a leg separating means, which is in the form of a plate 100 which can tilt about the pin 94 and is connected to an arm 96 in such a manner that it can pivot about a pin 98, is moved between the legs of the fowl 2, in the direction of arrow 102, as a result of arm 96 being actuated, in order to physically separate the legs of the fowl 2 from one another. The fowl 2 is also positioned in a substantially horizontal plane as a result of a stop 108, which can be extended and retracted in the directions of double arrow 104 by means of a drive means 106 (not shown in more detail), being placed against its rear side, and as a result of a stop 112, which is driven by drive means (not shown in more detail), being pressed against the breast of the fowl 2, on the front side of the fowl 2 in the direction of arrow 110, so that the fowl 2 is pushed against the stop 108 irrespective of the size of the fowl 2, which varies within certain limits. In the position of the fowl 2 which is reached in this way, a double hook 114 is moved in the direction of arrow 116 so that part of the legs projects through the opening which is delimited by the hook 114.

As illustrated in FIG. 6*c*, the support 84 is then tilted back about the pin 88 while the hook 10 is simultaneously being tilted. As a result, the fowl 2 will come to hang by its legs from hook 114, in which position optimum exsanguination is achieved.

The blood vessels in the neck area of the fowl 2 may have been opened in a stage which preceded the positioning of the support 84 in accordance with FIG. 6*a*, but may also in principle take place in the position of the fowl which is shown in FIG. 6*a* or in FIG. 6*b*.

Figure 7A:
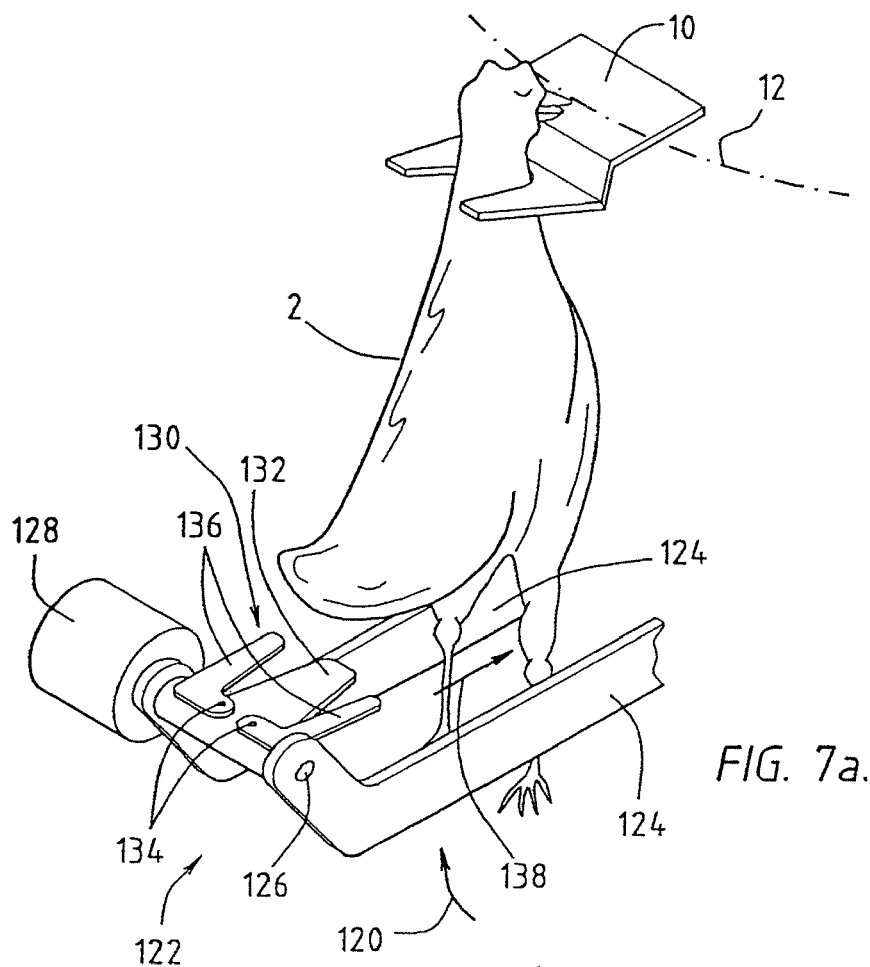
FIGS. 7a, 7b, 7c and 7d show perspective views of yet more successive steps involved in transferring the fowl from a position in which it is hung by its head to a position in which it is hung by its legs.
Figure 7B:
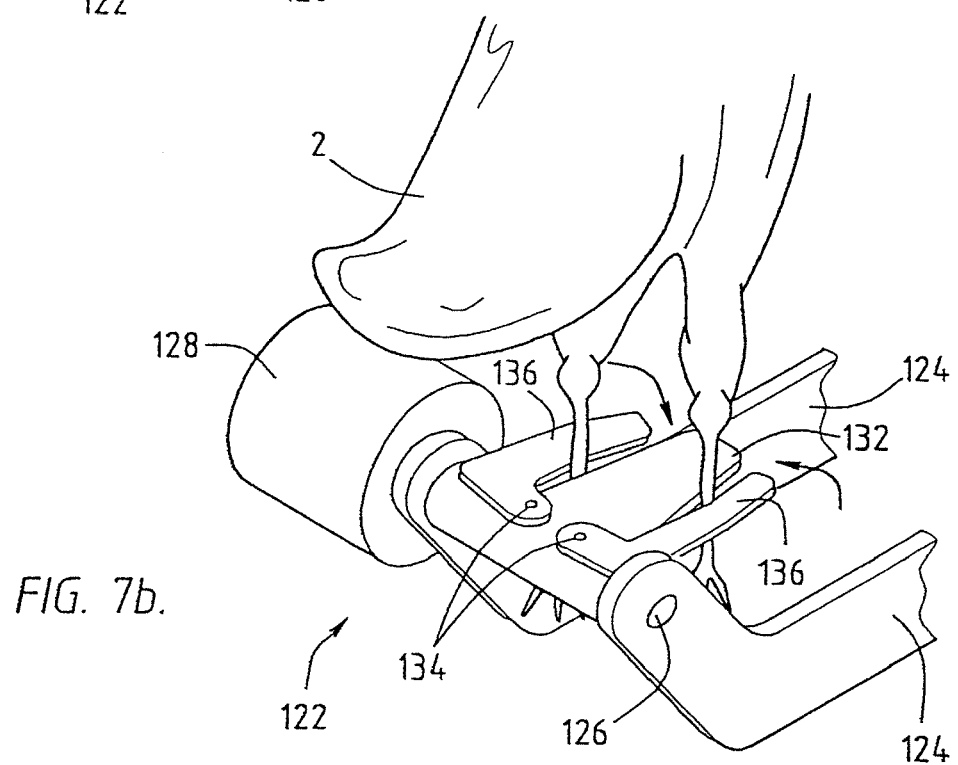

FIG. 7*a* shows a fowl 2 which is suspended by its head from a hook 10. From a direction which is indicated by arrow 120, a leg gripper unit 122 is moved into the area of the legs of the fowl 2. The leg gripper unit 122 comprises a set of arms 124 and a gripper 130 which can rotate about a pin 126, can be moved into a desired angular position by a drive unit 128 and comprises a fixed plate 132 and two gripper fingers 136, which can pivot about pins 134 and are likewise driven by the drive unit 128. The leg gripper unit is moved out of the position shown in FIG. 7*a*, in the direction of arrow 138, until the drumsticks of the legs of the fowl 2 are situated between the plate 132 and the gripper fingers 136. As illustrated by FIG. 7*b*, the gripper fingers 136 are then moved towards the plate 132 by the drive unit 128 in order to securely grip the legs of the fowl 2.

Figure 7C:
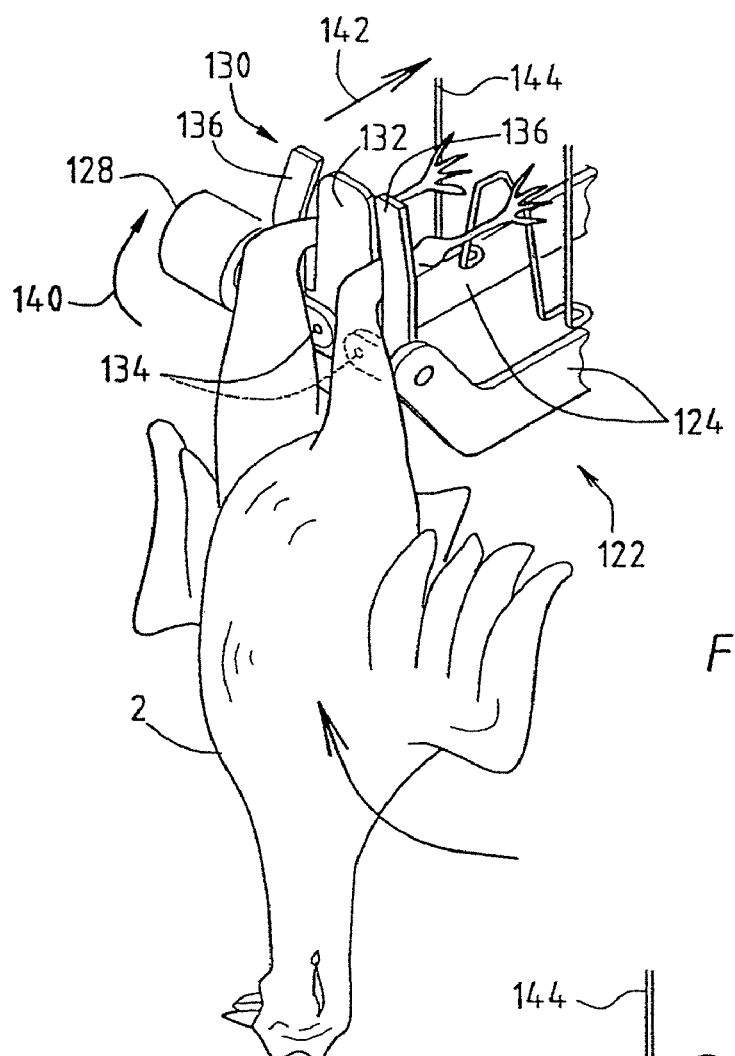
Figure 7D:
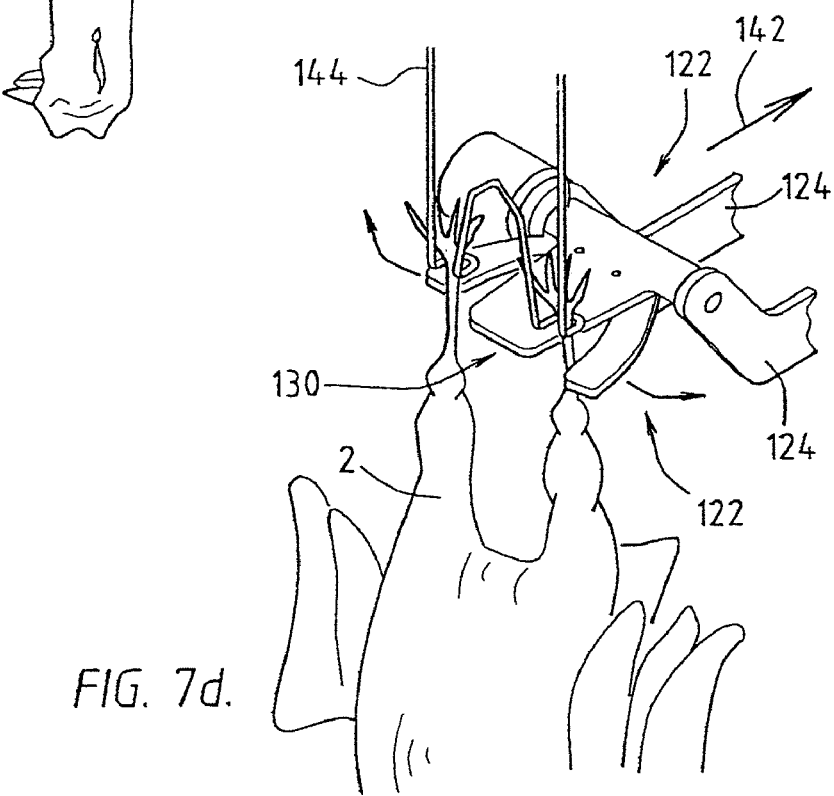

Then, the hanging of the fowl 2 by its head is eliminated, for example by pivoting the hook 10 in the manner illustrated in FIG. 6*c*. As a result, the fowl 2 will fall forwards between the arms 124. As illustrated in FIG. 7*c*, substantially at the same time the gripper 130 is rotated through approximately 270° in the direction of arrow 140 by the drive unit 128, resulting in a situation in which the fowl 2 is hanging freely by its legs and the drumsticks of the legs extend approximately in the horizontal direction. Then, the leg gripper unit 122 is moved in the direction of arrow 142 until the legs project through the opening which is delimited by the hook 144. As illustrated by FIG. 7*d*, a continuing movement of the leg gripper unit 122 in the direction of the arrow 142, under the hook 144, while the legs are at the same time released from the clamping produced by the gripper fingers 136, leads to the fowl 2 being hung from the hook 144. During this movement, the gripper 130 is rotated through approximately 90° counter to the direction of the arrow 140.

Figure 8:
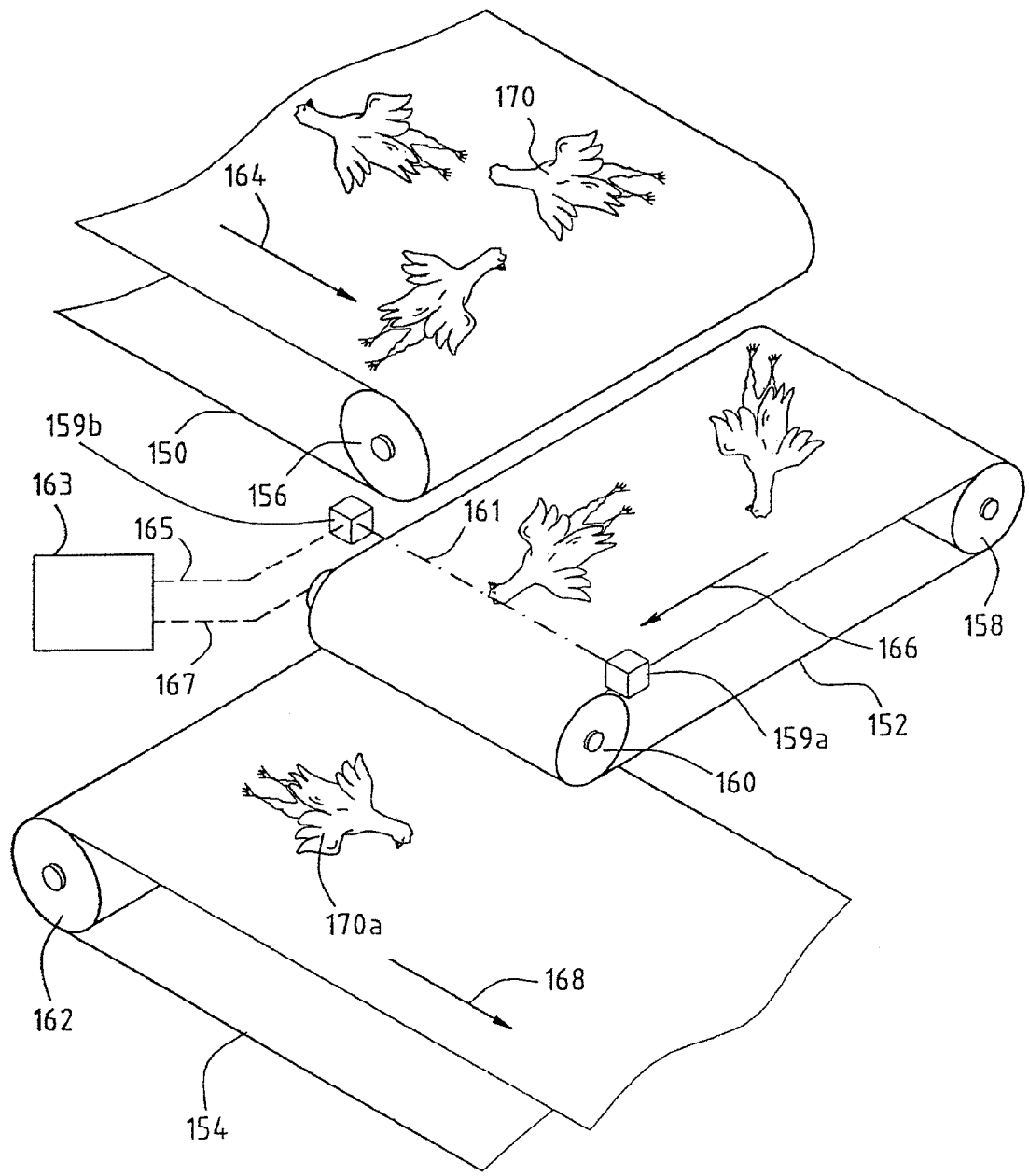
FIG. 8 shows a perspective view of a first device for imposing a distance between stunned or dead slaughter animals.

FIG. 8 shows three belt conveyors 150, 152, 154 which are mounted on respective rollers 156, 158, 160, 162 and are moving in the direction of respective arrows 164, 166, 168. Fowl 170 from a stunning or killing installation are conveyed in a random orientation and local density on the belt conveyor 150. The belt conveyor 150 is preferably, but not necessarily, driven intermittently, so that one or a few fowl 170 per unit time fall from the belt conveyor 150 onto the lower belt conveyor 152 at the location of the roller 156. If the belt conveyor 150 is driven intermittently, the time interval in which the belt conveyor 150 is at a standstill is preferably approximately equal to the time interval which it takes for the belt of the belt conveyor 152 to cover half its revolution. This ensures that firstly all the fowl 170 on the belt conveyor 152 are discharged, in the area of the roller 160, onto the belt conveyor 154 before further fowl 170 are supplied to the belt conveyor 152 from the belt conveyor 150. The belt conveyor 154 preferably runs at a constant speed which may be higher than the speed of the higher belt conveyor 152, in order to impose a distance between the fowl 170 and, in addition, to provided a certain degree of orientation in the direction shown in FIG. 8 for fowl 170*a*.

It is possible to provide a radiation source 159*a* in order to emit a beam 161, such as a light beam, over the belt conveyor 152 to a radiation receiver 159*b*, which beam 161 may be interrupted by a slaughter animal which is being conveyed over the belt conveyor 152. The radiation receiver 159*b* is coupled to a control device 163 as symbolically indicated by dashed line 165. The control device 163 is coupled to the drive of the belt conveyer 152 as symbolically indicated by dashed line 167. The control device 163 is adapted to stop the drive of the belt conveyor 152 for a predetermined time, via the coupling 167, when an interruption to the beam 161 is detected via the coupling 165, and then to resume driving of the belt conveyor 152 until another interruption to the beam 161 is discovered from the state of an uninterrupted beam 161, so that the fowl 170 on the belt conveyor 154 will be at a predetermined minimum distance from one another.

In FIG. 8, a fourth belt conveyor (not shown) can be mounted at the end of belt conveyor 152 facing away from belt conveyor 154. The arrangement of the fourth belt conveyor with respect to the belt conveyor 152 may be similar to the arrangement of the belt conveyor 154 with respect to the belt conveyor 152. In such a situation, belt conveyor 152 can be driven in a controlled way both in the direction of arrow 166 and in the opposite direction. When driven in said opposite direction, fowl fall from belt conveyor 152 down onto the fourth belt conveyor at the location of the roller 158.

FIG. 9 shows a belt conveyor 180, on the belt of which stunned or dead slaughter animals, such as fowls, can be conveyed in the direction of arrow 182. Above the belt conveyor there are stationary raised walls 184, 186, as well as an endless belt 188 which is mounted on rollers 190 and is driven, in a manner which is not shown in more detail, in the direction of arrow 192. A following belt conveyor 194 is adapted to convey slaughter animals, which are discharged at end 180a of belt conveyor 180, in the direction of arrow 196. A following belt conveyor 198, the belt of which is provided with walls 200 which project from the belt surface at regular intervals, is adapted to convey slaughter animals which are discharged at end 194a of the belt conveyor 194, in the direction of arrow 202.

Stunned or dead slaughter animals are distributed and supplied in locally varying densities on the belt conveyor 180, after which the conveying space available is narrowed at the location of belt 188 and the opposite part of the wall 184. The minimum distance between the walls 184 and 186 is selected in such a way that only one slaughter animal can pass at any one time through the passage defined by the walls 184, 186. The conveying speed of the belt conveyor 194 is preferably selected to be higher than that of the belt conveyor 180, so that slaughter animals which pass onto the belt conveyor 194 lie at a distance from one another. Various slaughter animals which are discharged to the belt conveyor 198, depending on the conveying speed of the belt conveyor 198, pass into adjacent compartments which are defined by the walls 200 or with one or more such compartments between them.

The function of the belt 188 is to avoid blockages and to assist with the flow of slaughter animals at the location of and upstream of the passage which is delimited by the walls 184, 186.

FIG. 10a again shows the belt conveyor 180, the functions of which are the same as those explained above in the context of FIG. 9. Slaughter animals which are discharged at the end 180a of the belt conveyor 180 via the passage between the walls 184 and 186 pass onto a belt conveyor 210 on which the slaughter animals are conveyed in the direction of arrow 211. As shown in FIGS. 10a and 10b, the belt conveyor 210, which is mounted on rollers 212a, 212b and 212c, comprises a horizontal part between the rollers 212a and 212b, a downwardly sloping part between the rollers 212b and 212c, and an upwardly sloping part between the rollers 212c and 212a. The belt of the belt conveyor 210 is covered with flaps 214 which—as seen in the conveying direction 211—slope forwards. There is only space for one slaughter animal between two successive flaps 214 on the part between the rollers 212c and 212a. As a result, each slaughter animal which is fed to the belt conveyor 210 by the belt conveyor 180, if the preferably constant conveying speeds of the respective belt conveyors 180, 210 are selected suitably, passes between a different pair of successive flaps 214 of the belt conveyor 210.

FIG. 11 shows a belt conveyor 220, the belt of which is moving in the direction of arrow 222. Above the belt conveyor 220 there is a raised wall 224, as well as an endless belt 228 which is mounted on rollers 226 and is driven, in a manner not shown in more detail, in such a manner that the belt moves in the direction of arrow 230. Above the belt conveyor 220, there is also a drum 232 which rotates about a pin 234, at a preferably constant speed, in the direction of arrow 236. On its outer circumference the drum 232 bears a number of, in this case four, flaps 238. Slaughter animals which are conveyed along the belt conveyor 222, after they have passed an end 222a thereof, move onto a belt conveyor 198, the structure and function of which has already been explained with reference to FIG. 9.

The furthest upstream part of the wall 224, together with the belt 228, forms a narrowing in the passage for arbitrarily distributed slaughter animals which are supplied with a random local density onto the belt of the belt conveyor 220. The narrowing is selected in such a way that the slaughter animals are able to pass through the passage between the belt 228 and the opposite part of the wall 224 only one by one, and then pass into a space between two successive flaps 238 of the rotating drum 232. The space between two successive flaps 238 and the opposite part of the wall 224 is preferably dimensioned in such a manner that there is only space for one slaughter animal, so that the slaughter animals downstream of the wall 224 are discharged onto the belt conveyor 198 at a distance from one another. The flaps 238 are preferably made from rubber, in order to prevent damage to the slaughter animals.

Figure 12A:
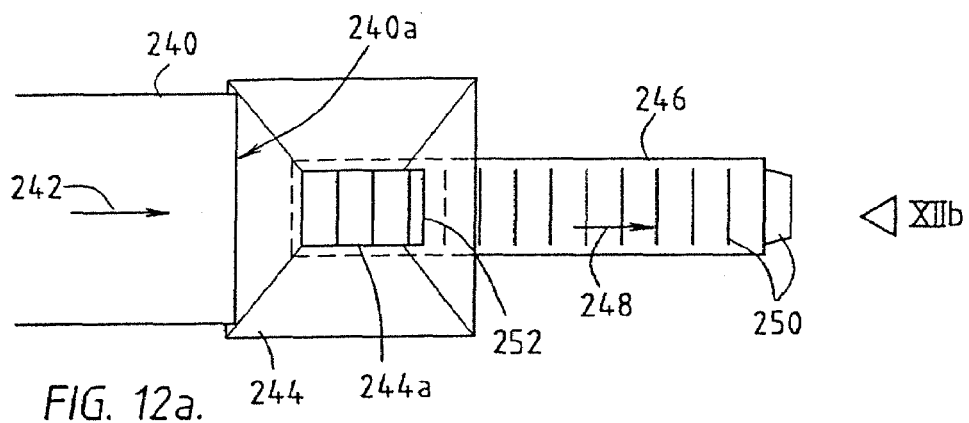
FIGS. 12a and 12b respectively show a plan view and a front view, in diagrammatic form, of a fifth device for imposing a distance between stunned or dead slaughter animals.
Figure 12B:
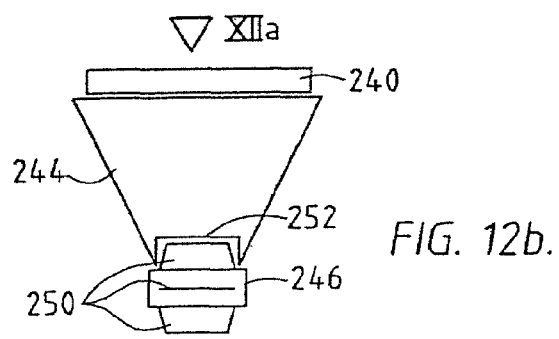

FIGS. 12a and 12b show a belt conveyor 240 with a belt which is driven preferably at constant speed, in a manner not shown in more detail, in the direction of arrow 242. One end 240a of the belt conveyor 240 is located above a hopper 244 with an outlet opening 244a above a belt conveyor 246, the belt of which is driven, in a manner not shown in more detail, in the direction of arrow 248. Like the belt of the belt conveyor 198 (FIG. 9), the belt of the belt conveyor 246 is also provided with raised walls 250. Two successive walls 250 delimit a space which can contain only one slaughter animal, so that slaughter animals which are supplied randomly by the belt conveyor 242 are spaced apart in the device shown in FIGS. 12a and 12b. At the location of its outlet opening 244a, the hopper 244 is provided with a cutout 252 for discharging the slaughter animals from the hopper 244 onto the belt conveyor 246.

Figure 13:
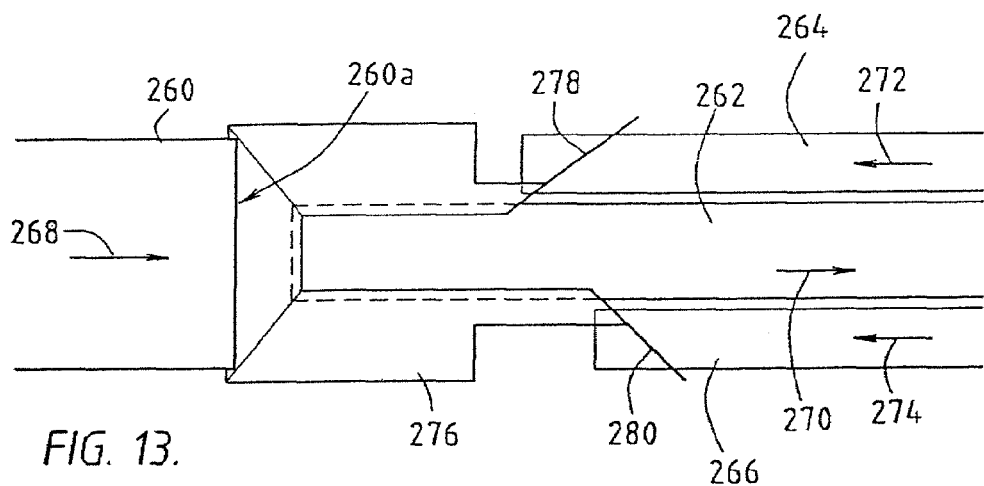
FIG. 13 shows a diagrammatic plan view of a sixth device for imposing a distance between stunned or dead slaughter animals.

FIG. 13 shows belt conveyors 260, 262, 264 and 266, the belts of which move in the directions indicated by respective arrows 268, 270, 272 and 274. At a discharge end 260 of the belt conveyor 260 there is a hopper 276 which is open on one side, where it ends in raised walls 278, 280 which diverge as seen in the conveying direction of the belt conveyor 262 and are situated a short distance above the belt conveyors 264, 266. The belt conveyors 264 and 266 are preferably arranged on a slope, in which case that edge of the top part of the belt of each belt conveyor 264, 266 which faces towards the belt conveyor 262 is located at the level of the top part of the belt of the belt conveyor 262, and the opposite edges of the top part of the belt of each belt conveyor 264, 266 is situated at a higher level. Thus, the surfaces of the belts of the belt conveyors 264, 266 can run substantially parallel to the side walls of the hopper 276 which they adjoin.

The width of the belt conveyor 262 is such that slaughter animals which have been discharged into the hopper 276 by the belt conveyor 260 can only be positioned on it one behind the other. The slaughter animals which leave the belt conveyor 262 move onto or against one of the belt conveyors 264, 266 and, on or by this conveyor, are returned to the walls 278, 280, which guide these slaughter animals to the belt conveyor 262, so that ultimately all the slaughter animals are discharged one behind the other by the belt conveyor 262. As seen in the direction of the arrow 270, the walls 278 and 280 are offset with respect to one another, in order to prevent an accumulation of slaughter animals at the ends which face towards the hopper 276.

After an interval has been imposed between slaughter animals, for example in one of the ways shown in FIGS. 8-13, or a combination thereof, the slaughter animals are each as far as possible oriented in such a manner that they are in a predetermined position or one of a limited number of predetermined positions, so that they can be transferred to another carrier or a processing device with little effort or even in an automated manner, without human intervention. The way in which the orientation of the slaughter animals is influenced will be explained below with reference to a number of embodiments of devices.

Figure 14:
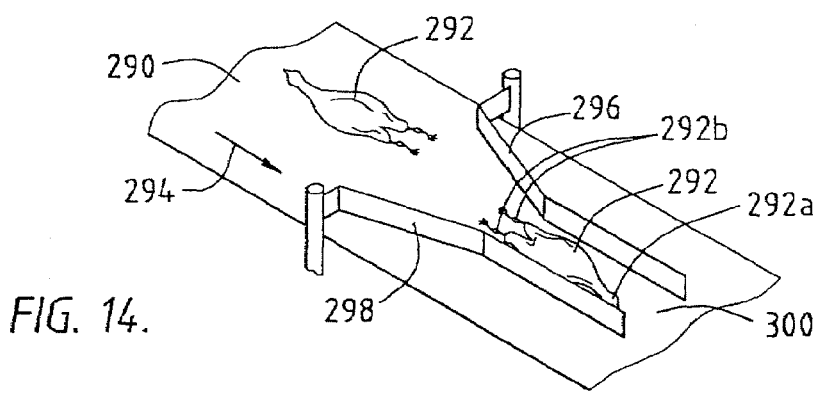
FIG. 14 shows a perspective view of a first device for orienting stunned or dead slaughter animals.

FIG. 14 shows a belt conveyor 290, on the belt of which slaughter animals 292, in this case poultry, are being conveyed in the direction of arrow 294. Stationary guide walls 296, 298 are arranged above the moving belt of the belt conveyor 290, which walls, as seen in the direction of the arrow 294, define a passage 300 which narrows to a predetermined width. With the device shown in FIG. 14, it is possible to orient fowl 292 which lie one behind the other on the belt of the belt conveyor 290, in the direction of the arrow 294, so that when these fowl 292 leave the passage 300 they adopt a predetermined position with respect to the edges of the belt of the belt conveyor 290, with the head 292a or the legs 292b pointing forwards.

Figure 15:
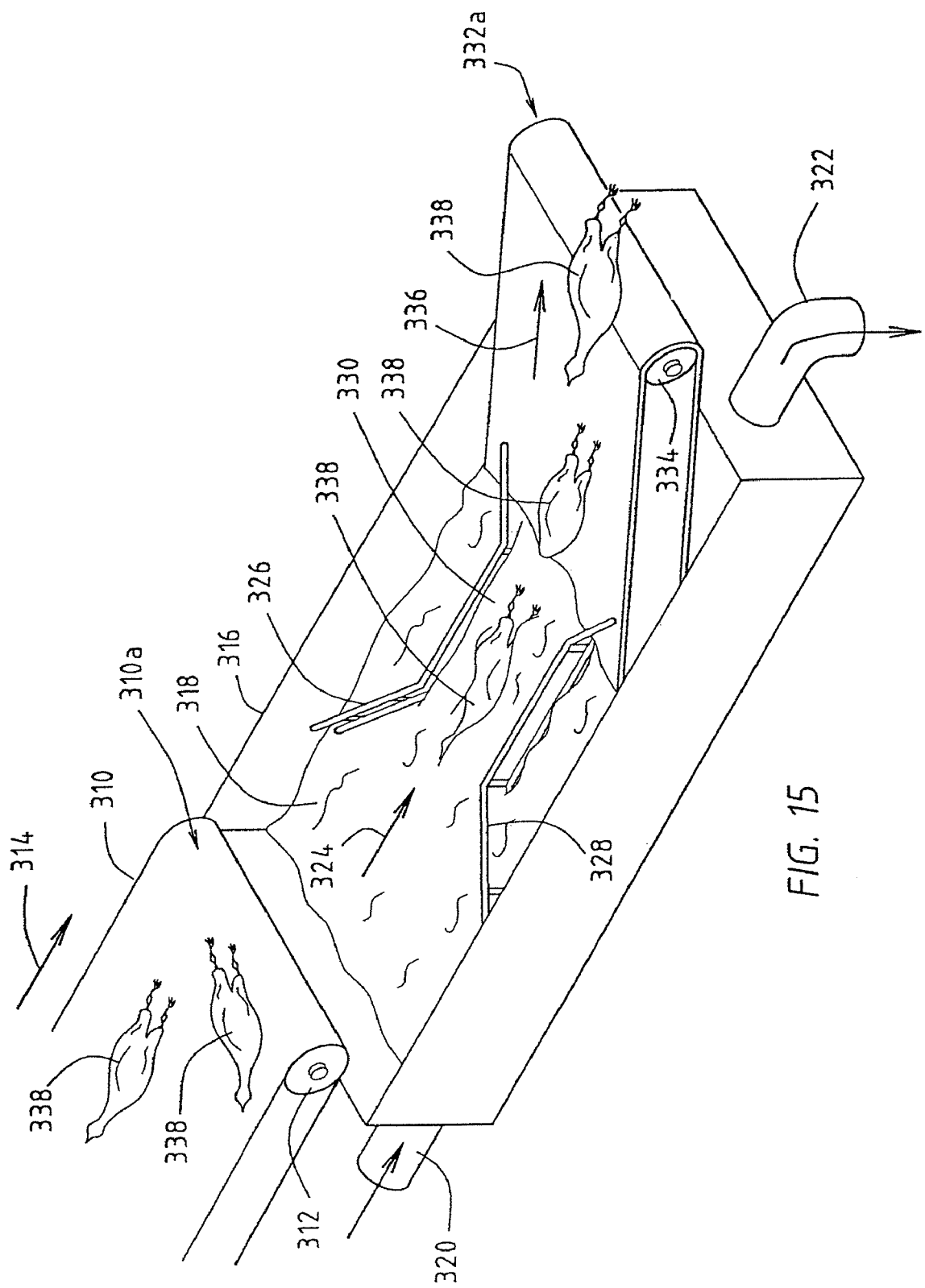
FIG. 15 shows a perspective view of a second device for orienting stunned or dead slaughter animals.

FIG. 15 shows a belt conveyor 310 which is mounted, inter alia, on a roller 312 and is driven, in a manner not shown in more detail, in the direction of arrow 314. Beneath discharge end 310a of belt conveyor 310 there is a tank 316 which has been filled to a predetermined level with a liquid 318, such as water, with a relative density which is at least as high as the average relative density of the slaughter animal which is to be processed in the device.

The tank 316 is provided with a feed 320 and an outlet 322 for the liquid 318 which is located inside the tank 316. The flow rate of liquid 318 which is fed through the feed 320 to the tank 316 is substantially equal to the flow rate of liquid 318 which is discharged from the tank 316 through the outlet 322 and is set at such a level that a suitable flow of liquid 318 in the direction of arrow 324 is established in the tank. In the vicinity of the surface of the liquid 318, two guides 326, 328 are arranged in a stationary position in the tank 316, in a manner which is not shown in more detail. The guides 326, 328 delimit a passage 330, the width of which decreases in the direction of the arrow 324. At the downstream side of the guides 326, 328 there is a belt conveyor 332, one end of which is situated in the liquid 318 below the guides 326, 328, and an opposite end 332a of which is situated outside the tank 316. The belt conveyor 332, which is mounted, inter alia, on a roller 334, is arranged on a slope and is driven, in a manner not shown in more detail, in the direction of arrow 336.

Slaughter animals 338, in this Figure fowl, which are supplied on the belt conveyor 310 and are placed at a distance from one another fall off the discharge end 310a of the belt conveyor 310 into the liquid 318, in which they are carried along, in the direction of the arrow 324, by the flow prevailing in the liquid, towards and through the passage 330. The slaughter animals 338 then come into contact with the belt of the belt conveyor 332 and are thus carried along in the direction of the arrow 336 and are discharged via the discharge end 332a of this conveyor. In the case shown in the figure, i.e. that of orienting fowl, the prevailing flow of the liquid 318 to which the fowl is subjected immediately after it leaves the discharge end 310a of the belt conveyor 310, and the anatomy of the fowl, ensure that the legs of the fowl are always directed forwards and the breast of the fowl is always facing downwards between the guides 326, 328. The guides 326, 328 prevent the fowl from losing their orientation which they have obtained in this way, so that the fowl at the discharge end 332a of the belt conveyor 332 are always in a fixed orientation and at a predetermined distance from the edges of the belt of the belt conveyor 332.

Figure 16:
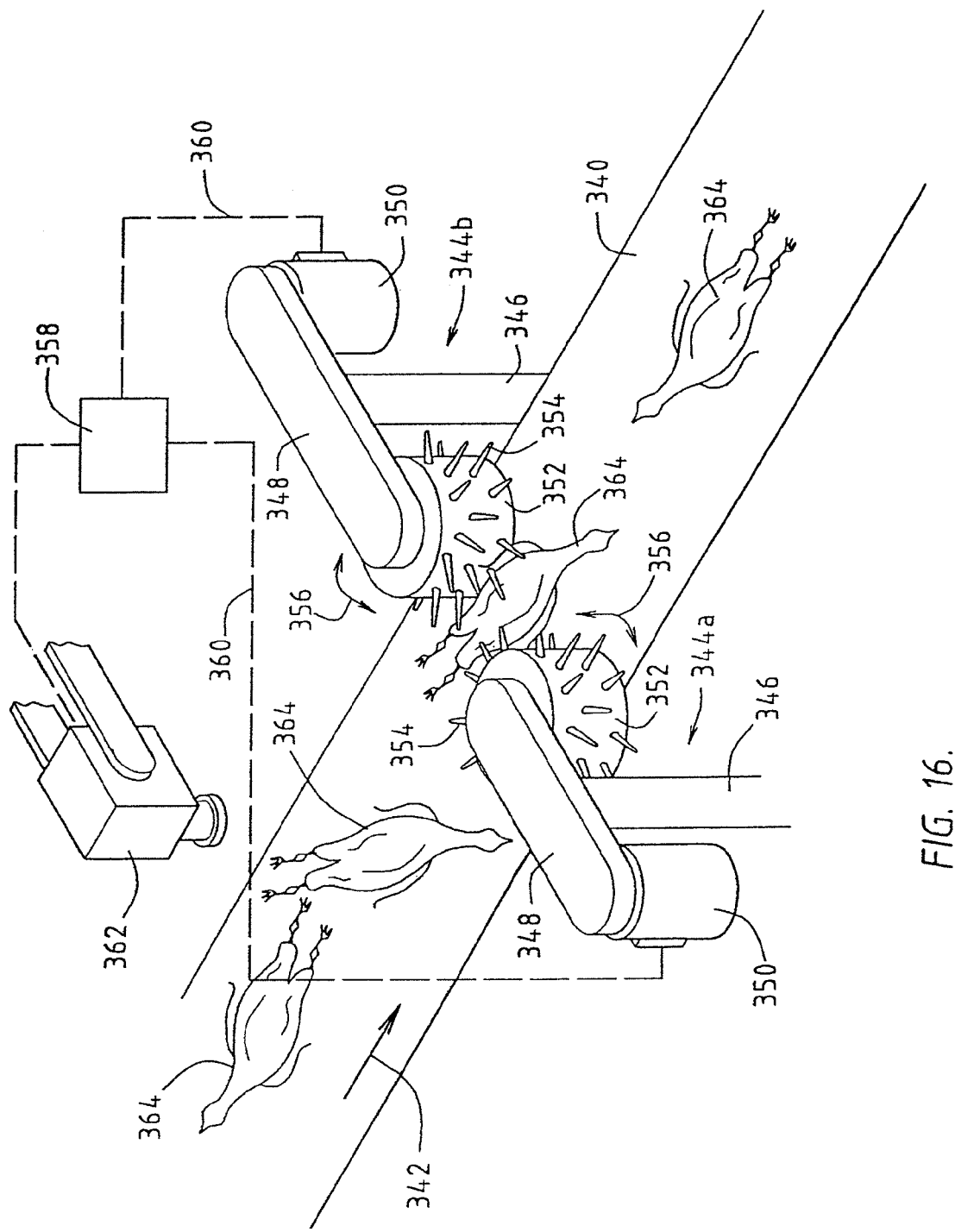
FIG. 16 shows a perspective view of a third device for orienting stunned or dead slaughter animals.

FIG. 16 shows a belt conveyor 340 which is driven, in a manner not shown in more detail, in the direction of arrow 342. Stationary manipulators 344a, 344b are arranged on either side of the continuously or intermittently moving belt conveyor 340, which manipulators each comprise a column 346 on which a mechanical transmission 348 is mounted, which couples a motor 350 to a drum 352 on which radially projecting, preferably flexible fingers 354 are arranged. With the aid of the motors 350, the drums 352 can be moved in the directions indicated by the double arrows 356. The drums 352 are situated a short distance above the belt conveyor 340. The movements of the drums 352 in the directions of the double arrows 356, which movements do not have to be synchronous, simultaneous or in the same direction, are brought about by controlling the respective motors 350 in a suitable manner using a data processing system 358, as symbolically represented by the dashed lines 360. This control is effected on the basis of data which emanate from an image-recording system 362, which is used to determine the position of individual slaughter animals 364 on the belt conveyor 340. Taking into account the conveying speed of the belt conveyor 340, the manipulators 344a, 344b are controlled by the data processing system 358 in such a manner that their fingers 354 move a slaughter animal 364 which is located within the working area of the manipulators 344a, 344b into a desired orientation. If necessary, it is possible to ensure that all the slaughter animals are moved into the same orientation.

Figure 17:
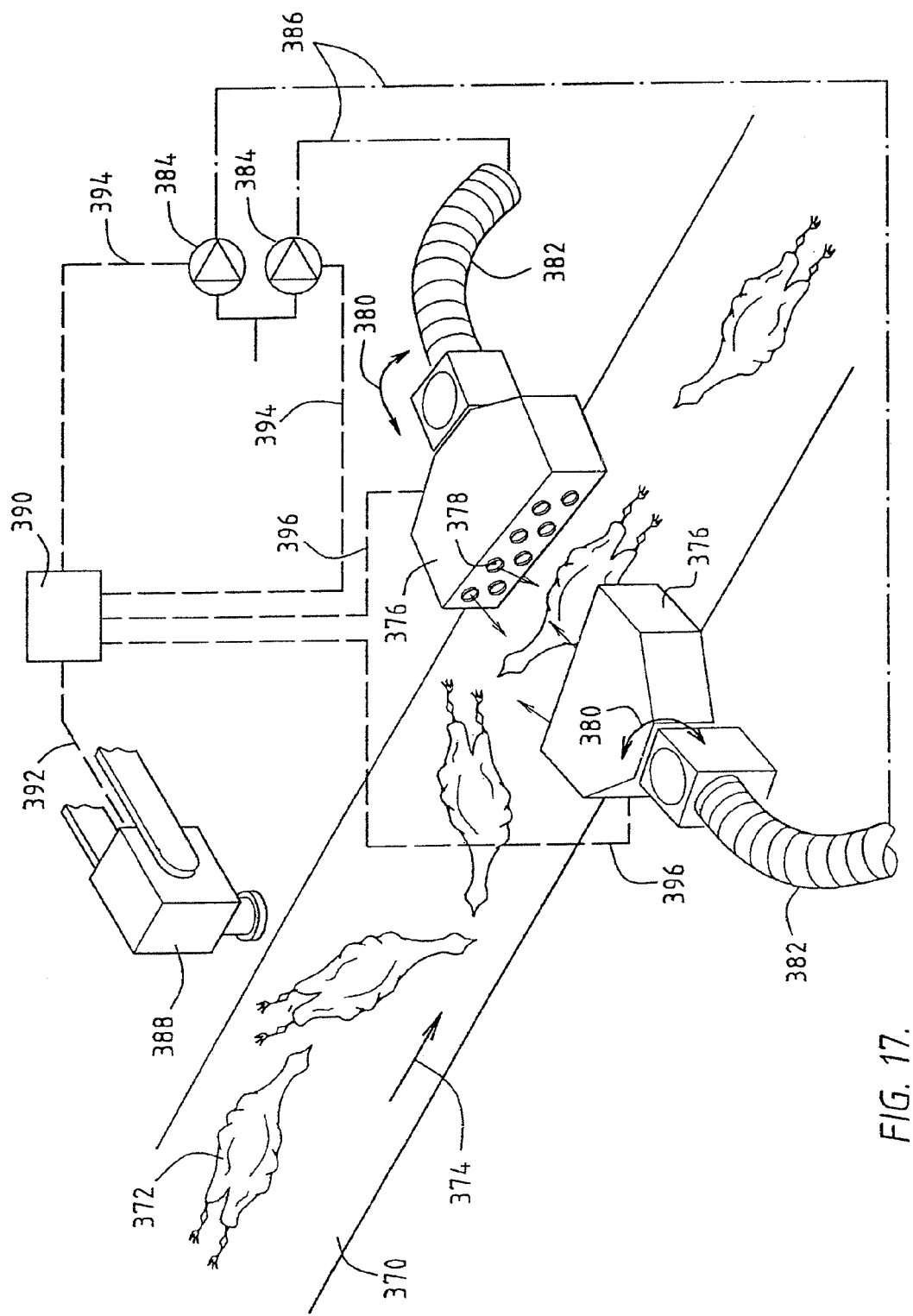
FIG. 17 shows a perspective view of a fourth device for orienting stunned or dead slaughter animals.

FIG. 17 shows a belt conveyor 370 over which slaughter animals 372, in the case illustrated fowl, are conveyed at intervals in the direction of arrow 374. Blowing nozzles 376, each with blowing openings 378, are arranged in a stationary position in the vicinity of the edges of the belt conveyor 370. The blowing nozzles 376 can each be pivoted in a controllable manner in the directions of the double arrow 380, in order to direct the air flows emerging from the—optionally separate—blowing openings 378 over the belt conveyor 370 as required. Compressed air is fed to the blowing nozzles 376 via hoses 382, which are each connected to a pump 384, as indicated by dot-dashed lines 386 in the figure. Above the belt conveyor 370, there is a camera 388 which takes pictures of the slaughter animals 372 lying on the belt conveyor 370. The image information in question is transmitted to a data processing system 390, as symbolically represented by dashed line 392. The data processing system 390 analyses the image information by using this information to derive the orientation of the individual slaughter animals and, on the basis of this orientation, regulating the flow rate of each pump 384 and/or the separate blowing openings 378, as symbolically represented by dashed lines 394, and adjusting the pivoted position of the blowing nozzles 376, as symbolically represented by dashed lines 396. This control sequence takes place for each individual slaughter animal 372 and has the aim of bringing about a predetermined orientation on the belt conveyor 370 for all the slaughter animals 372 while they are moving past the blowing nozzles 376.

Figure 18:
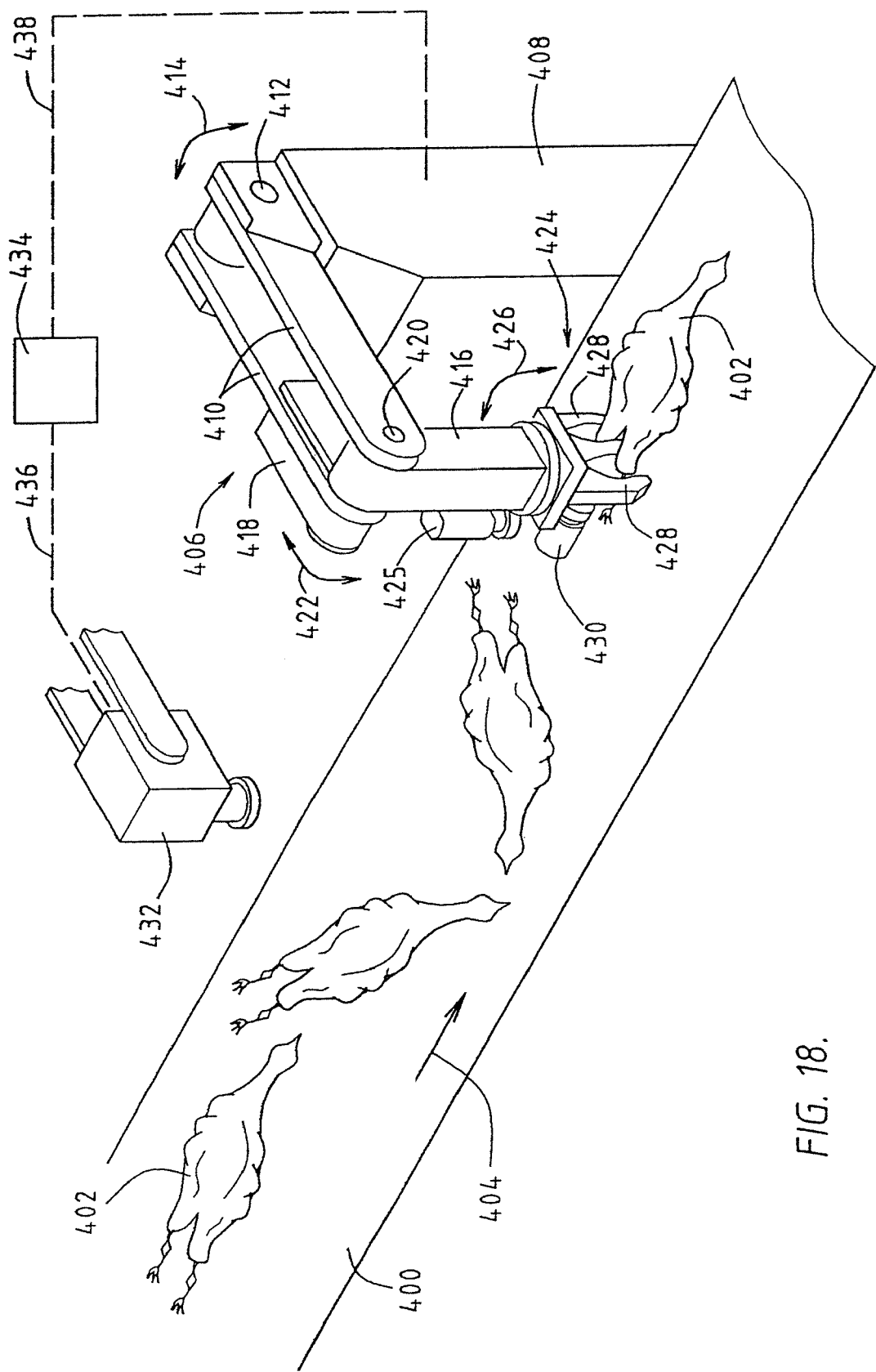
FIG. 18 shows a perspective view of a fifth device for orienting stunned or dead slaughter animals.

FIG. 18 shows a belt conveyor 400 on which slaughter animals 402, in this figure fowl, are conveyed at a distance from one another and in a random orientation, in the direction of arrow 404. A controllable gripper and positioning device, referred to as positioning device 406 for short, is arranged in a stationary position next to the belt conveyor 400. The positioning device 406 comprises a casing 408, which can rotate about a vertical axis and/or can be displaced along the belt conveyor 400, arms 410 which can be pivoted in a controllable manner about a pin 412, in the directions of double arrow 414, an arm 416, which with the aid of a drive 418 can be pivoted about a pin 420 in the directions of double arrow 422, and a gripper device 424 which is connected to the arm 416 and can rotate, in a controllable manner with the aid of a drive 425, about an axis which is parallel to the longitudinal axis of the arm 416 in the directions of double arrow 426, the gripper device 424 comprising two grippers 428 which can be opened and closed, with the aid of a controllable drive 430, in order to securely grip the legs or another part, such as the neck or the body, of a slaughter animal 402.

A camera 432 for taking pictures of slaughter animals 402 which are conveyed along the belt conveyor 400, is arranged in a stationary position above the belt conveyor 400. The image information which is obtained in this way is transmitted to a data processing system 434, as symbolically represented by dashed line 436. In the data processing system, the image information is used to establish where the legs of the respective slaughter animals are located upstream of the positioning device 406. When the appropriate data have been determined by the data processing system 434, the positioning device 406 is controlled on the basis of this information, as symbolically represented by dashed line 438, so as to securely grip the legs of a slaughter animal 402 and to displace the slaughter animal which has been taken hold of in such a manner that it acquires a predetermined orientation on the belt conveyor 400, after which the slaughter animal is released again by the positioning device 406.

Figure 19:
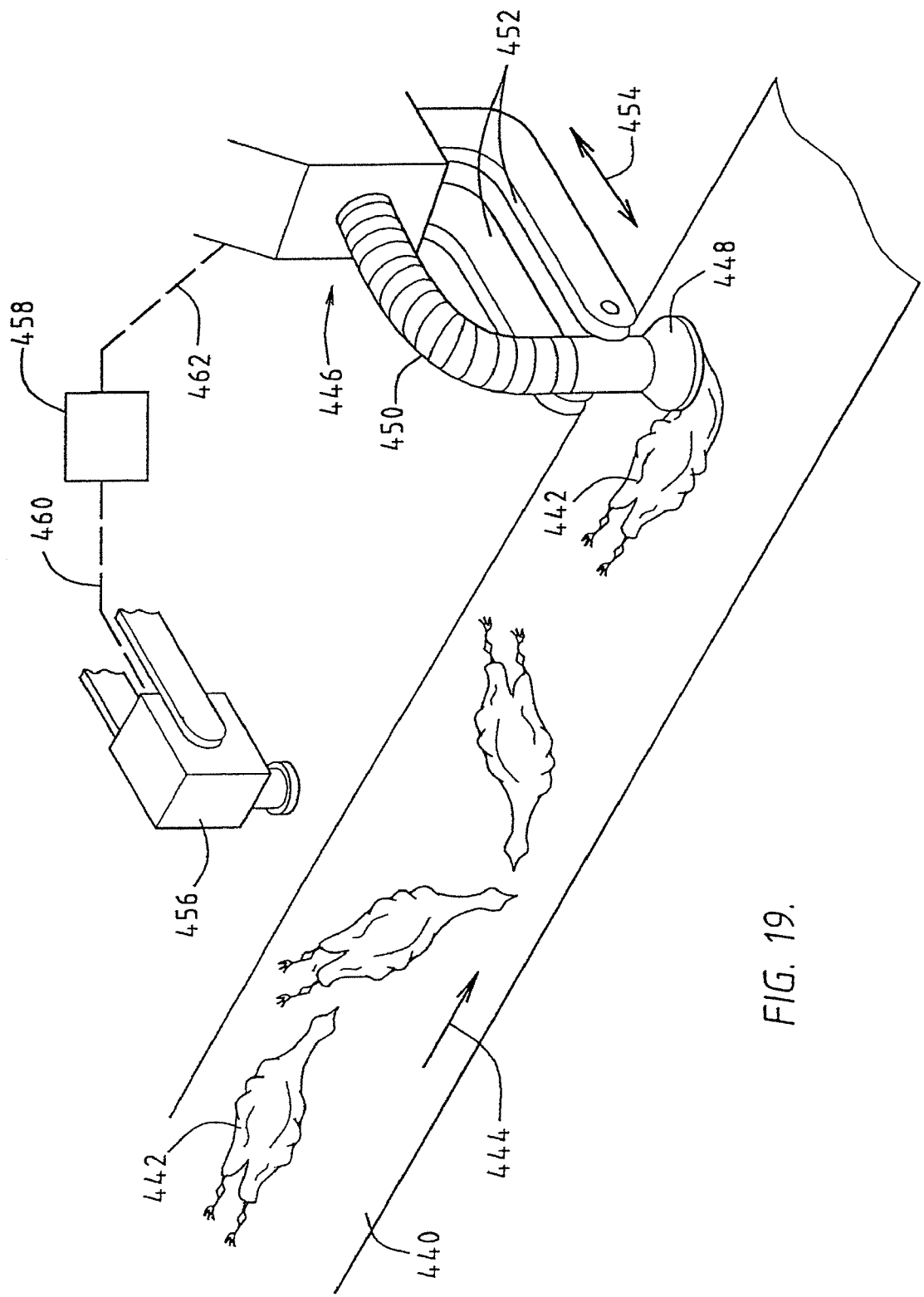
FIG. 19 shows a perspective view of a sixth device for orienting stunned or dead slaughter animals.

FIG. 19 shows a belt conveyor 440, on which slaughter animals 442, in the case illustrated fowl, which lie at a distance from one another are being conveyed in the direction of arrow 444. A suction device 446 with a suction nozzle 448 which, via a hose 450, is coupled to the suction side of a pump (not shown in more detail), is arranged in a stationary position next to the belt conveyor 440. The suction nozzle 448 is located a certain distance above the belt conveyor 440 and can be moved to and fro over the width of the belt conveyor 440 in a controllable manner by means of arms 452, in the directions of double arrow 454. A camera 456, for taking pictures of the slaughter animals 442 which are located on the belt conveyor 440, is arranged in a stationary position above the belt conveyor 440. The corresponding image information is transmitted to a data processing system 458, as symbolically represented by dashed line 460. On the basis of the image information from the camera 456, the data processing system 458 determines the position of the heads of the respective slaughter animals 442 and, on the basis of this information, controls the suction device 446, as symbolically represented by dashed line 462, in such a manner that the suction nozzle 448 is positioned above the head of a slaughter animal 442, the head is sucked securely onto the suction nozzle 448, and the slaughter animal 442 is then displaced by its head so as to adopt a predetermined orientation with respect to the belt conveyor 440.

Figure 20:
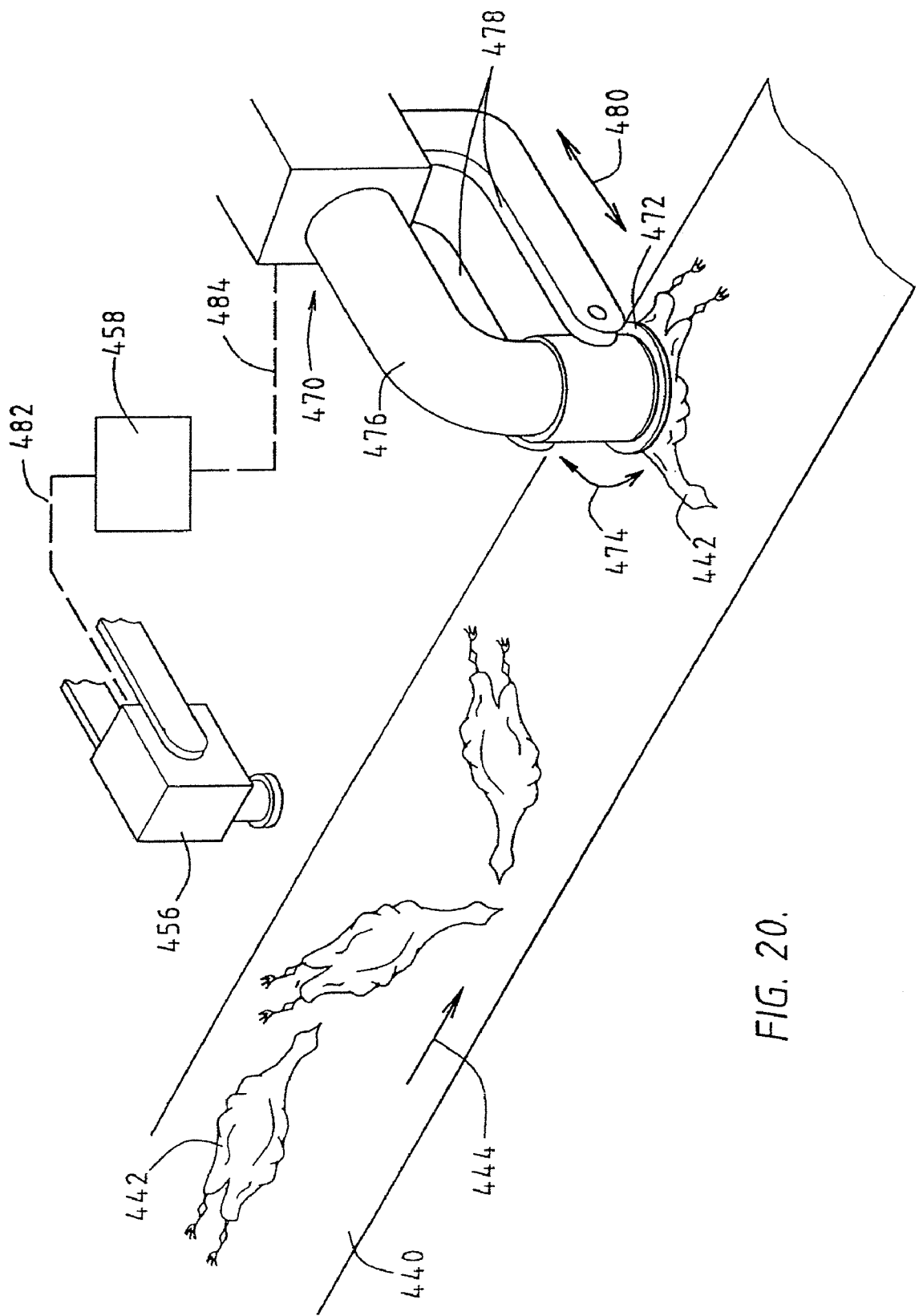
FIG. 20 shows a perspective view of a seventh device for orienting stunned or dead slaughter animals.

As in FIG. 19, an arrangement which is shown in FIG. 20 includes the belt conveyor 440, which is moving in the direction of the arrow 444, the slaughter animals 442, the camera 456, the data processing system 458 and a suction device 470. The suction device 470 comprises a suction nozzle 472 which can be rotated, in a controllable manner which is not shown in more detail, in the direction of double arrow 474 and is connected, via a hose 476, to the suction side of a pump (not shown in more detail). The suction nozzle 472 is located a certain distance above the belt conveyor 440 and, with the aid of arms 478, can be moved to and fro over the width of the belt conveyor 470 in a controllable manner, in the directions of double arrow 480.

In FIG. 20, the camera 456 is used to obtain images of slaughter animals 442 which are located upstream of the suction device 470, on the belt conveyor 440. The image information in question is transmitted to the data processing system 458, as symbolically represented by dashed line 482. The data processing system 458 is adapted to determine the position and orientation of the slaughter animals 442 on the basis of the image information and, on the basis of this position and orientation, to control the suction device 470, as symbolically represented by dashed line 484. For this purpose, the suction nozzle 472 is positioned above a slaughter animal 442, which is located on the belt conveyor 440, with the aid of the arms 478, the slaughter animal 442 is sucked securely onto the suction nozzle 472 and, if appropriate, rotated in the direction of the arrow 474, and the slaughter animal 442 is put back onto the belt conveyor 440 in a predetermined position and in a predetermined orientation, by eliminating the suction from the suction nozzle 472.

In FIG. 20, the slaughter animals 442 are poultry having wings. The suction nozzle 472 of the suction device 470 has such dimensions that only poultry 442 lying on the belt conveyor 440 with their wings facing the suction nozzle 472 will be taken up by the suction device 470, since only in this orientation the suction nozzle 472 can produce enough force to lift the poultry 442 from the belt conveyor 440. Poultry 442 lying on the belt conveyor 440 with one or two wings facing away from the suction nozzle 472, as well as poultry without wings, or slaughter animals or parts thereof having certain weights or dimensions will not be caught by the suction device 470. Thus the suction device 470 operates selectively.

Figure 21:
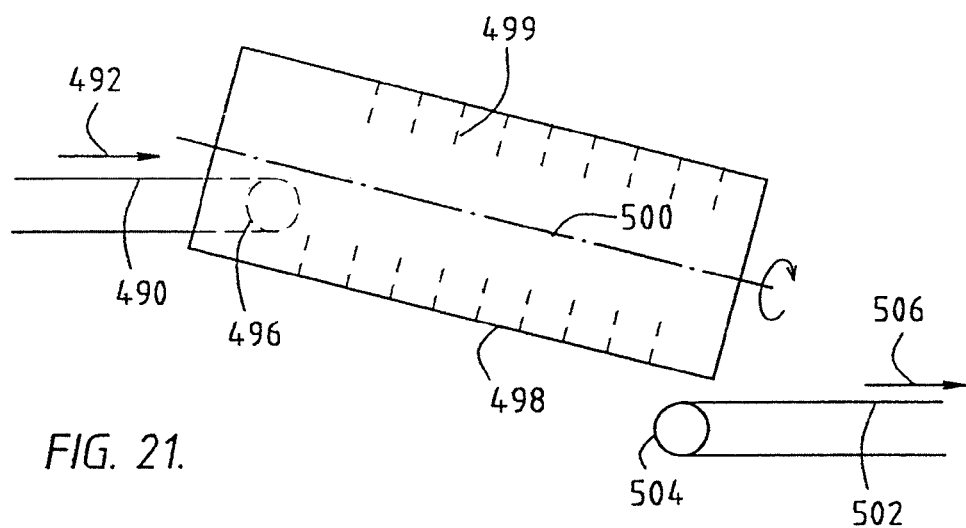
FIG. 21 shows a diagrammatic side view of an eighth device for orienting stunned or dead slaughter animals.

FIG. 21 shows a belt conveyor 490 on which stunned or dead slaughter animals are supplied in the direction of arrow 492. At one end 494, the belt conveyor 490 is mounted on a roller 496. The end 494 projects into a cylinder 498 which is provided with open ends and can be rotated, in a manner which is not shown in more detail, about its longitudinal axis 500, at a predetermined speed. As seen from the end 494 of the belt conveyor 490, the longitudinal axis 500 of the cylinder 498 slopes downwards. That end of the cylinder 498 which is remote from the belt conveyor 490 is located above a belt conveyor 502 which is mounted, inter alia, on a roller 504 and the belt of which is driven in the direction of arrow 506.

A slaughter animal which is supplied along the belt conveyor 490 and is located at a distance from a following slaughter animal falls into the rotating cylinder 498 at the end 494 and will roll around the inside of this cylinder and adopt a position which is such that the longitudinal axis of the slaughter animal is substantially parallel to the longitudinal axis 500 of the cylinder 498. At the same time, the force of gravity will move the slaughter animal towards the lowest point of the cylinder 498, where it will leave the cylinder 498 and be carried along by the belt conveyor 506 in the orientation which has been produced by the cylinder 498.

Along its inner wall, the cylinder 498 may be provided with helical, radially inwardly projecting wall 499 with a pitch which is at least equal to the width dimension of the slaughter animal, with the result that the slaughter animal will leave the cylinder 498 in an orientation in which the longitudinal axis of the slaughter animal is oriented substantially transversely with respect to the longitudinal axis 500 of the cylinder 498.

Figure 22A:
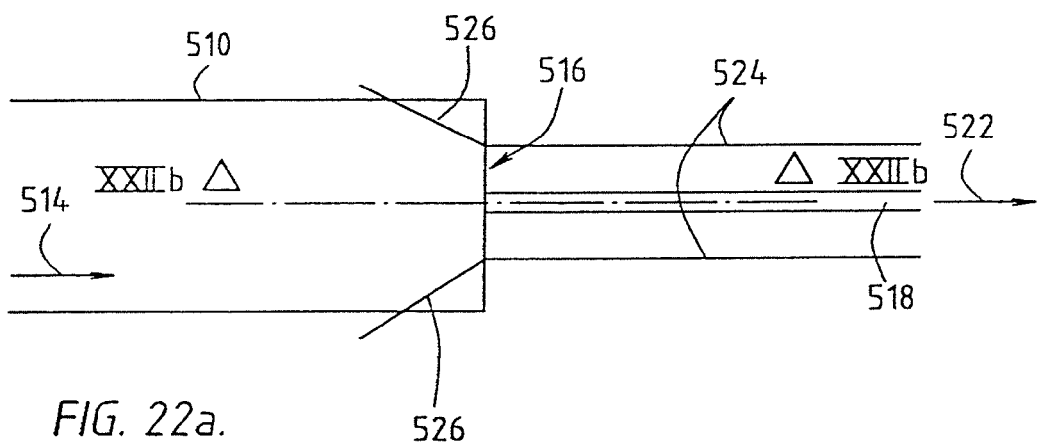
FIGS. 22a and 22b respectively show a plan view and a cross section, in diagrammatic form, of a device for moving oriented poultry onwards.
Figure 22B:
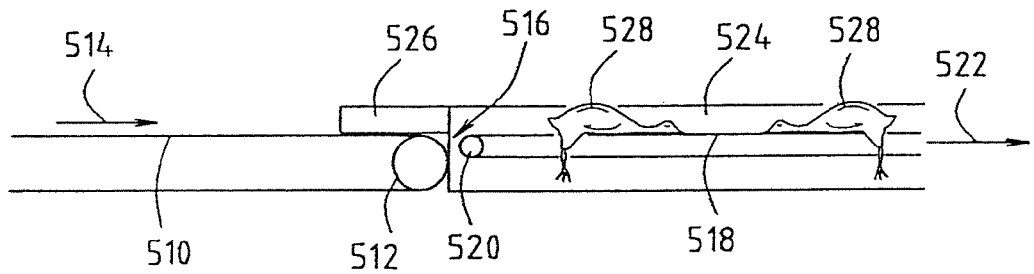

FIGS. 22*a* and 22*b* show a belt conveyor 510 which is mounted, inter alia, on a roller 512 and on which stunned or dead slaughter animals, which are lying on their belly or their back, are supplied in the direction of arrow 514, it being possible for the (hind) legs of the slaughter animals to be directed both in the direction of the arrow 514 and in the opposite direction. At one end 516 of the belt conveyor 510 there is a following, narrow belt conveyor 518 which is mounted, inter alia, on a roller 520 and the belt of which is driven in the direction of arrow 522. On either side of the belt conveyor 518 there are mutually parallel walls 524 which are at a distance from one another which is such that the slaughter animals can be conveyed between the walls 524 in the positions described above but not in other positions. The walls 524 adjoin walls 526 above the belt conveyor 510, which serve to guide slaughter animals which are supplied along the belt conveyor 510 between the walls 524. As illustrated in particular by FIG. 22*b*, fowl 528 which are lying on their front are conveyed through the belt conveyor 518 in such a manner that the legs of the fowl 528 are located on either side of the belt conveyor 518 and project downwards with respect to the belt conveyor 518. This fact is exploited in an automatic device for hanging the fowl 528 by their legs, for example of the type which is known per se from EP-A-0,145,077. Legs of fowl which are lying on their backs, incidentally, are located entirely above the belt conveyor 518 and are less suitable for gripping with an automatic device.

Figure 23:
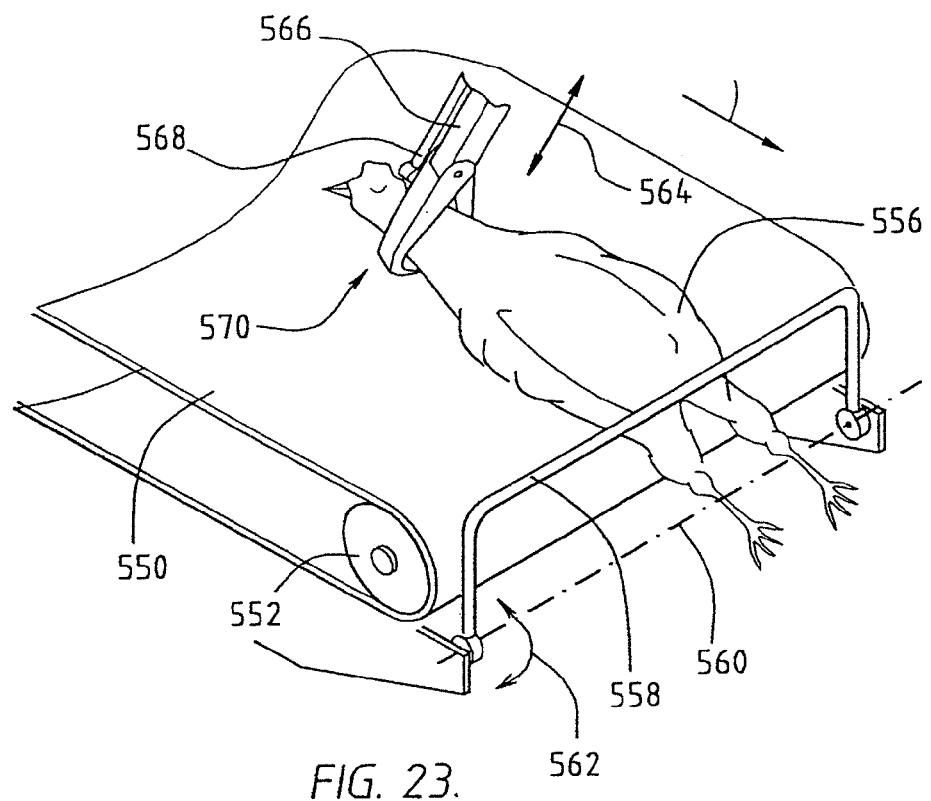
FIG. 23 shows a perspective view of how a fowl is picked up from a conveyor using a gripping device.

FIG. 23 shows a belt conveyor 550 which is mounted, inter alia, on a roller 552 and the belt of which is moving in the direction of arrow 554, and a slaughter animal 556, in this case a fowl, which is being conveyed on the belt conveyor 550 with its legs in the direction of the arrow 554. An orientation of this nature can be obtained, for example, in the arrangement which is shown in FIG. 15. At the end of the belt conveyor 550, in the vicinity of the roller 552, there is a stop bracket 558 which can be pivoted about an axis 560 in a controllable manner, not shown in more detail, in the directions of double arrow 562, between the raised position shown in the figure and a position in which it is pivoted away from the belt conveyor 550. In its raised position, the stop bracket 558 blocks further conveying of the slaughter animal 556 by the belt conveyor 550, after which an arm 566, which can move in the directions of double arrow 564 and has a gripper 570 which can be opened and closed via an actuating arm 568, can pick up the slaughter animal 556 by its neck, in order, for example, to hang it over a hook 10. When the slaughter animal 556 is picked up from the belt conveyor 550 by the arm 566, the stop bracket 558 is pivoted away.

Figure 24:
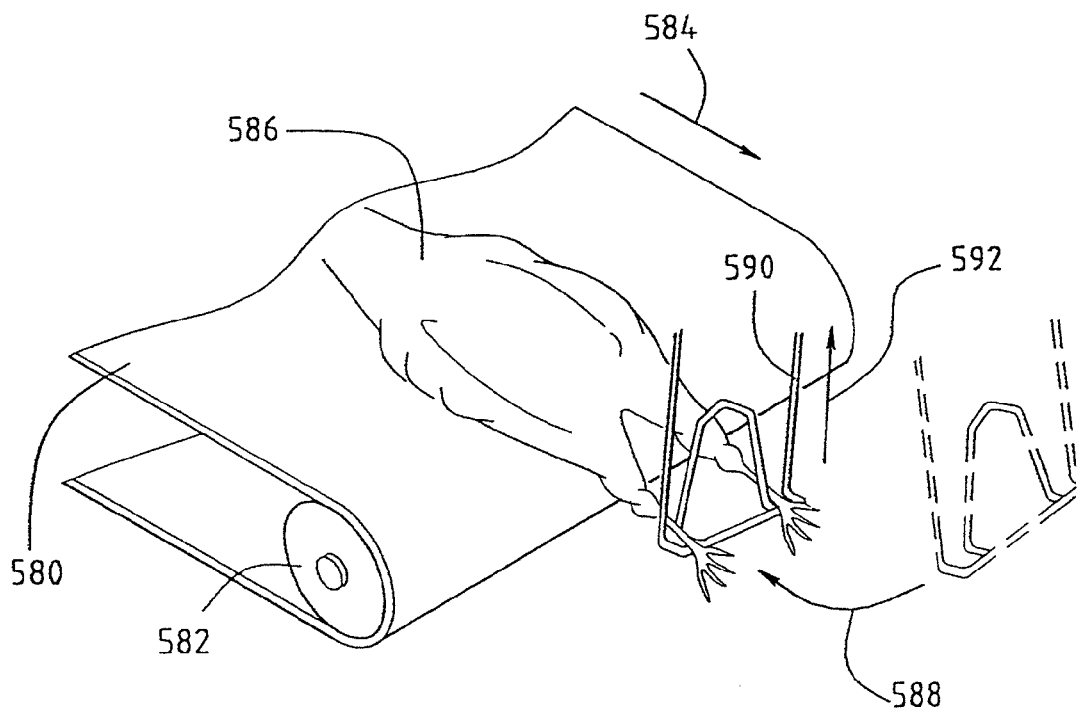
FIG. 24 shows a perspective view of how legs of poultry, which is being moved onwards on a conveyor and has been oriented, are moved into a hook.

FIG. 24 shows a belt conveyor 580 which is mounted, inter alia, on a roller 582 and the belt of which is moving in the direction of arrow 584. The belt conveyor 580 supplies slaughter animals 586, in this case fowl, which have been oriented with their legs in the direction of the arrow 586, for example using the arrangement shown in FIG. 15. A hook 590 is moved towards the belt conveyor 580 manually or automatically, synchronized with the supply of the slaughter animals 586, in the direction of arrow 588, during which movement the legs of the slaughter animal 586 move into designated parts of the hook 590. The hook 590 is then lifted in the direction of arrow 592, with the result that the fowl is lifted off the belt conveyor 580 and comes to hang from the hook 590 in order to be processed further.

Figure 25:
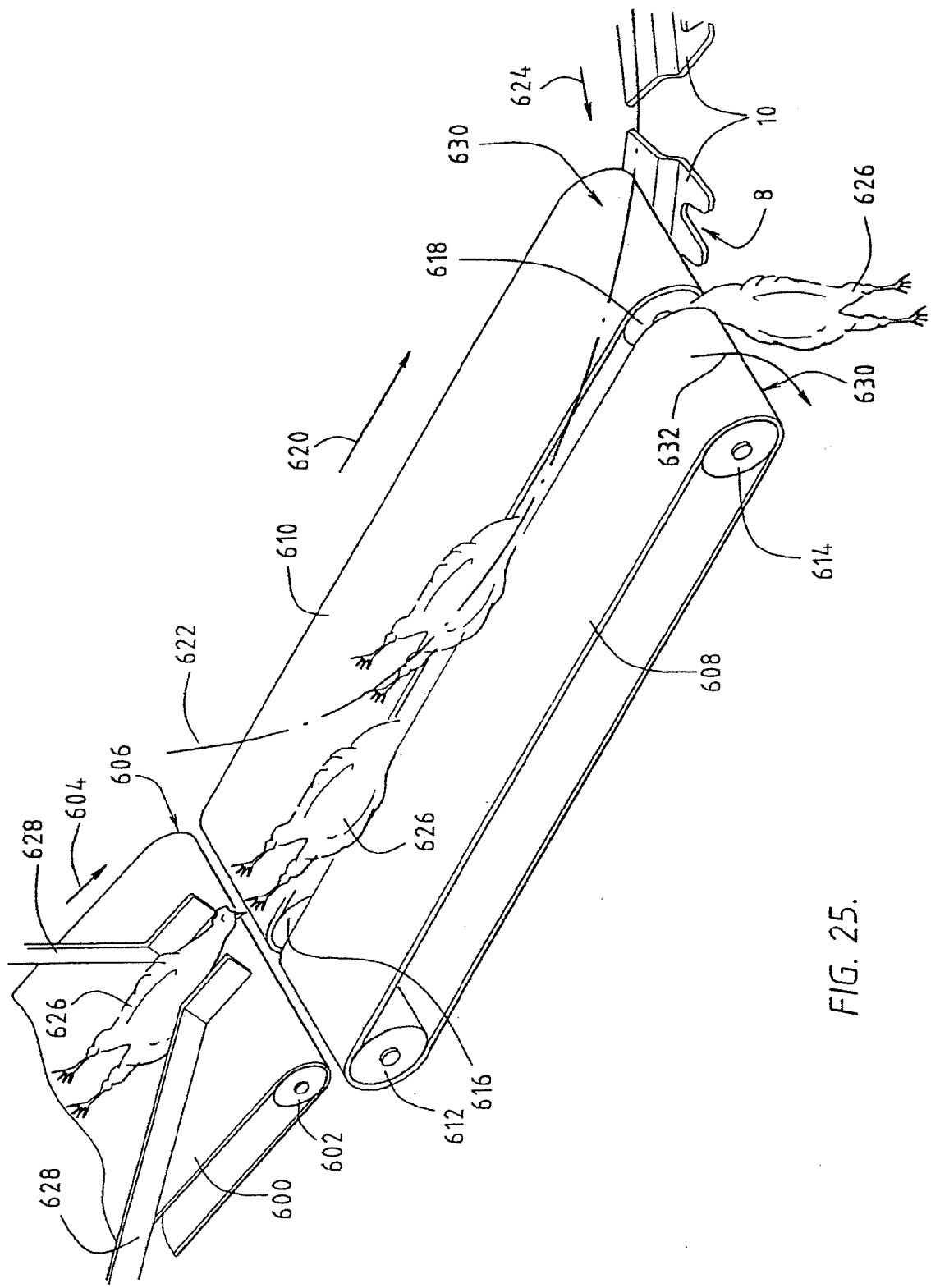
FIG. 25 shows a diagrammatic, perspective view of a device for moving the neck of poultry which is being moved onwards on a conveyor and has been oriented into hooks.

FIG. 25 shows a belt conveyor 600 which is mounted, inter alia, on a roller 602 and the belt of which is moving in the direction of arrow 604. At one end 606 of the belt conveyor 600, two parallel belt conveyors 608, 610 are arranged at a distance apart, which parallel belt conveyors are mounted on rollers 612, 614 and 616, 618, respectively and are both driven at an equal speed, in a manner now shown in more detail, in order for the belts of the these conveyors to be moved in the direction of arrow 620.

A dot-dashed line 622 indicates a substantially horizontal path along which hooks 10 are moved under the belt conveyors 608, 610 in the direction of arrow 624. In this case, the path 622 is selected in such a manner that the recesses 8 in the hooks 10 are situated a certain distance below the gap between the belt conveyors 608, 610, the speed of movement of the hooks 10 substantially corresponding to the speed of movement of the belts of the belt conveyors 608, 610.

Slaughter animals 626 which are supplied along the conveyor belt 600 are guided, by means of stationary walls 628 which converge in the direction of the arrow 604, towards the centre of the conveyor belt 600. At the end 606 of the belt conveyor 600, the head of the slaughter animal 626 moves into the gap between the belt conveyors 608, 610. However, the gap is too narrow to allow the body of the slaughter animal 626 to pass through, with the result that the body comes to rest on the belts of the belt conveyors 608, 610. Preferably, the width of the gap between the belt conveyors 608, 610 decreases in the direction of the arrow 620, so that the necks of the slaughter animals 626 are clamped between the belt conveyors 608, 610 at the location of the rollers 614, 618. As a result, the slaughter animals 626, after they have moved past the end 630 of the belt conveyors 608, 610, come to hang by their neck and are then carried along in the direction of arrow 632. By ensuring that the width of the gap between the belt conveyors 618, 610 then increases again, so that the neck is released from the gap, a hook 10 is able to assume responsibility for conveying the slaughter animal 626 along the path 622, taking over from the belt conveyors 608, 610. The arrangement shown in FIG. 25 can therefore be used to hang slaughter animals 626 automatically from the hooks 10 by their necks.

Figure 26:
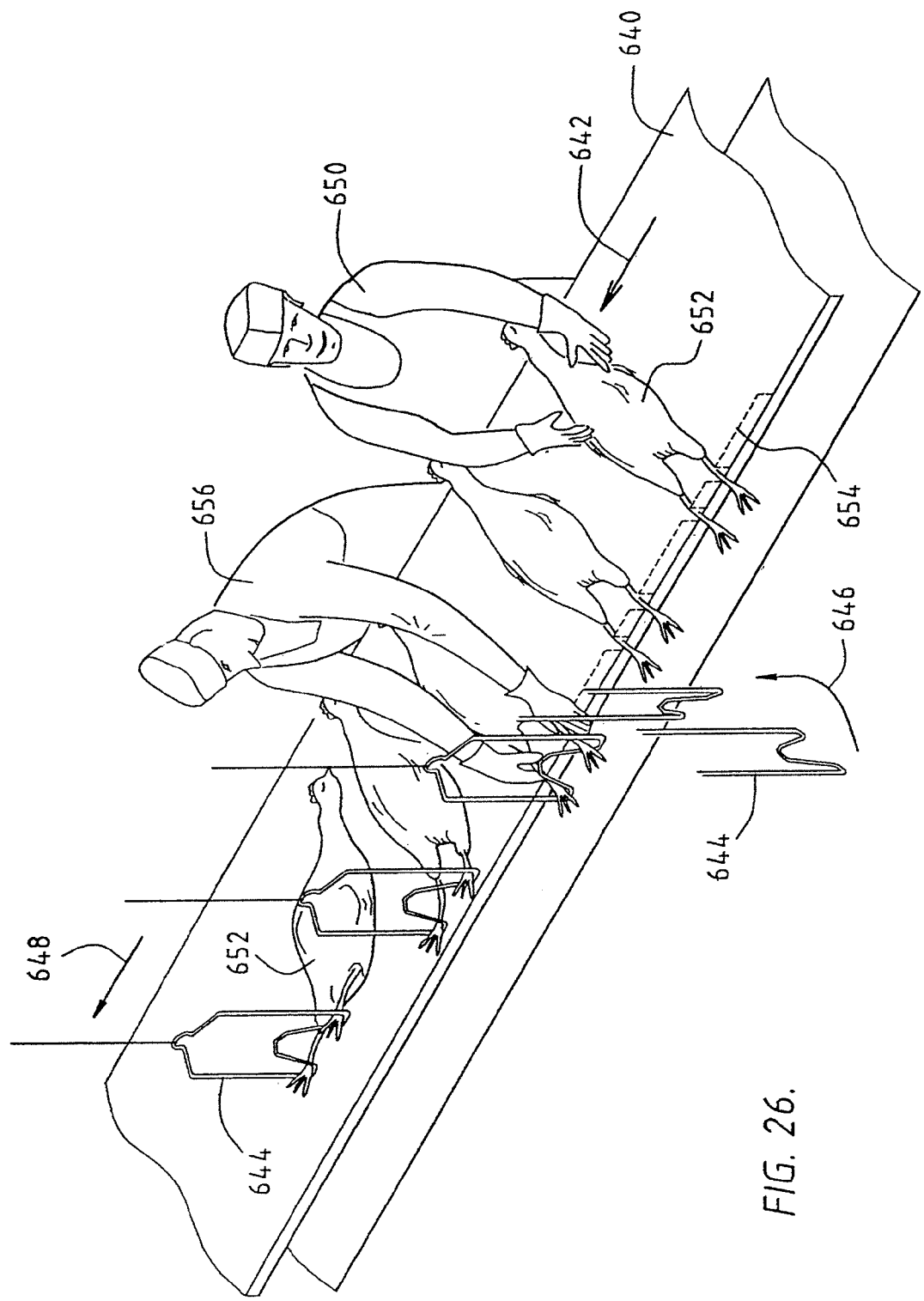
FIG. 26 shows a perspective view of how poultry which has been oriented on a belt conveyor is manually hung from hooks.

FIG. 26 shows a belt conveyor 640 which is driven, in a manner not shown in more detail, in the direction of arrow 642. Along a curved path, hooks 644 are guided in the direction of arrows 646 and 648 along an edge of the belt conveyor 640 and further upwards. One person 650 orients slaughter animals 652, in this case fowl, which are supplied on the belt conveyor 640, in such a manner that their legs project over the edge of the belt conveyor 640. If appropriate, the belt of the belt conveyor 640 may be provided with raised walls 654 or the like (denoted by dashed lines in FIG. 26), in which case the ends of the walls define recesses in which the legs of the slaughter animals 652 can be positioned at a predetermined distance from one another. A second person 656 moves the legs of the slaughter animals into the hooks 644, after which the slaughter animals are carried along by the hooks 644. Introducing the legs of the slaughter animals 652 requires only a slight effort, without there being any need to lift the body of the slaughter animal 652, which can remain resting on the belt conveyor 642. If the hooks 664, at the location where the person 656 is illustrated in the figure, move along synchronously with the belt conveyor 640 and, at the same time, undergo an upwards movement during which the legs of the slaughter animals move into the hook openings, the legs of the slaughter animals can be gripped by the hooks 664 without the intervention of the person 656.

Figure 27:
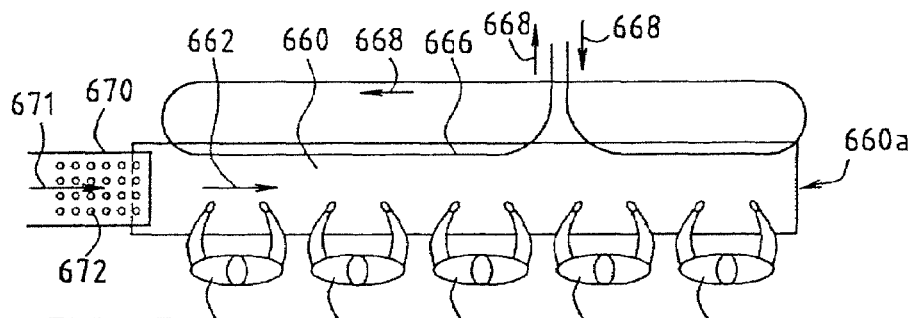
FIG. 27 shows a diagrammatic, plan view of a second arrangement for hanging slaughter animals from hooks.

FIG. 27 shows a belt conveyor 660, the belt of which is driven, in a manner not shown in more detail, in the direction of arrows 662. Next to the belt conveyor 660 there are a number of people 664*a*-664*e*. Above the belt conveyor 660 there is a part of a path of an overhead conveyor 666 bearing hooks which are not shown in more detail and are moving in the direction of arrows 668. Where parts of the path intersect one another, there is a difference in level between these parts. The speed at which the hooks move along the path of the overhead conveyor 666 is substantially equal to the conveying speed of the belt conveyor 660 Via a belt conveyor 670, stunned or dead slaughter animals are fed to the belt conveyor 660 in the direction of arrow 671. If the slaughter animals have been stunned or killed with the aid of a gas mixture which may be harmful to the people 664a-664e, the belt conveyor 670 is preferably equipped with openings 672 through which gases which are located above the belt conveyor 670 and have escaped from the slaughter animals are sucked out.

The people 664a-664e hang slaughter animals which have been supplied on the belt conveyor 660 from free hooks of the overhead conveyor 666, in which case in principle every hook is accessible to person 664d and the smallest number of hooks will be accessible to person 664c. Providing the people 664d and 664e with access to the largest number of free hooks, it is possible to prevent slaughter animals from arriving at end 660a of the belt conveyor 660 without having been hung up and without it being possible to do so.

Figure 28:
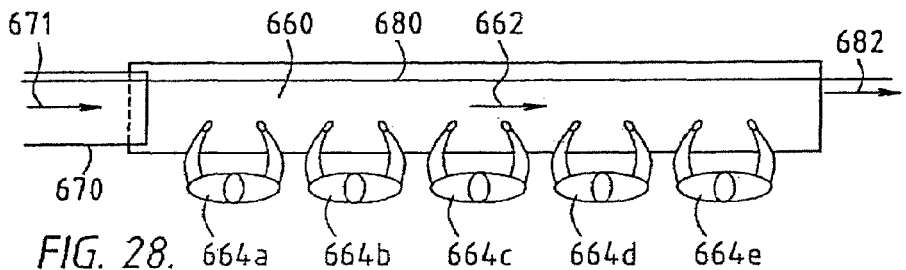
FIG. 28 shows a diagrammatic plan view of a third arrangement for hanging slaughter animals from hooks.

FIG. 28 shows a similar arrangement to that shown in FIG. 27, but in this case an overhead conveyor 680 runs in a straight path over the belt conveyor 660. The overhead conveyor 680 is moving in the direction of arrow 682. There is thus a "concurrent flow" of slaughter animals on the belt conveyor 660 and hooks on the overhead conveyor 680, so that it may be difficult in particular for the people 664d and 664e to find sufficient free hooks to hang the slaughter animals from. This problem can be at least partially overcome by reversing the conveying direction 682 of the overhead conveyor 680, so that at any rate the person 664e always has free hooks available.

Figure 29:
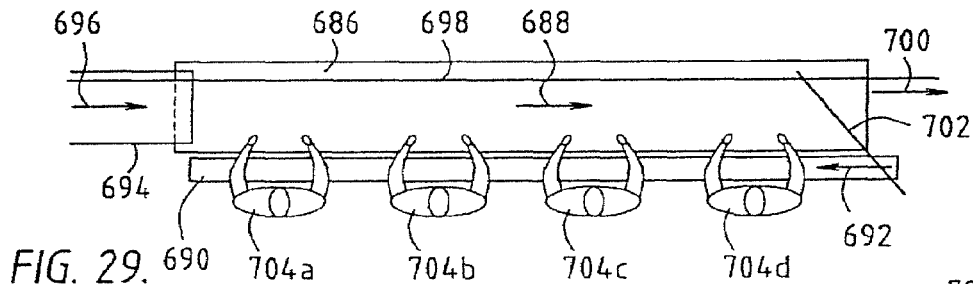
FIG. 29 shows a diagrammatic plan view of a fourth arrangement for hanging slaughter animals from hooks.

FIG. 29 shows a belt conveyor, the belt of which is driven, in a manner not shown in more detail, in the direction of arrow 688. A narrow belt conveyor 690, which is driven, in a manner not shown in more detail, in the direction of arrow 692, is arranged next to and parallel to the belt conveyor 688. Dead or stunned slaughter animals which are supplied via a belt conveyor 694 in the direction of arrow 696 move onto the belt conveyor 688 and, while they are being conveyed on this belt, are hung from hooks of an overhead conveyor 698 which is located above the belt conveyor 686, the hooks moving in the direction of arrow 700. A wall 702 which is arranged in a stationary position a short distance above the belt conveyors 686 and 690 guides slaughter animals which cannot be hung up quickly enough by persons 704d from the belt conveyor 686 to the belt conveyor 690, after which the slaughter animal in question is returned past the people 704c, 704b and 704a. Since there are always more hooks empty in the direction of the arrow 692, one of the people 704a-704c can still hang a slaughter animal which has been returned along the belt conveyor 690 from a hook of the overhead conveyor 698.

Figure 30:
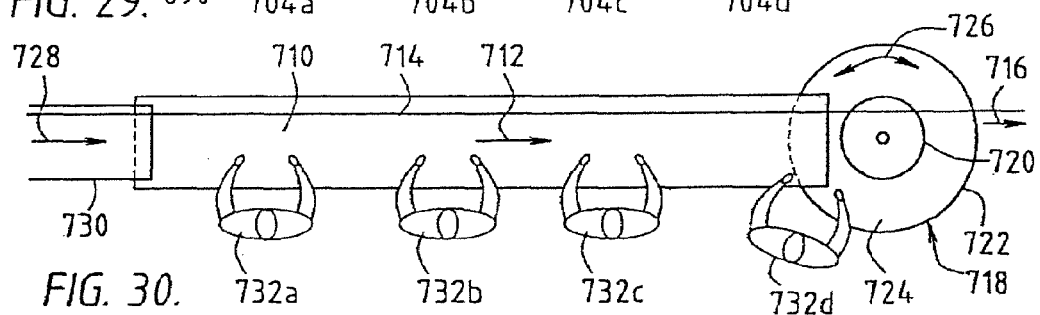
FIG. 30 shows a diagrammatic plan view of a fifth arrangement for hanging slaughter animals from hooks.

FIG. 30 shows a belt conveyor 710, the belt of which is moving, in a manner not shown in more detail, in the direction of arrow 712. Above the belt conveyor 710, there is an overhead conveyor 714 in which hooks are moving in the direction of arrow 716. At the downstream end of the belt conveyor 710, there is a carousel conveyor 718 with two raised walls 720, 722, between which an annular plate 724 is rotated, in a manner not described in more detail, in one of the directions of double arrow 726. A slaughter animal which has moved onto the belt conveyor 710 via belt conveyor 730, which is moving in the direction of arrow 728, and has not been hung from the belt conveyor 710 onto a hook of the overhead conveyor 714 by any of people 732a-732d reaches the carousel conveyor 718, which functions as a buffer. The slaughter animal can then still be picked up by the person 732d from the carousel conveyor 718 and can be hung from a hook of the overhead conveyor 714. The fact that a slaughter animal reaches the carousel conveyor forms an indication that the number of slaughter animals supplied per unit time is too high. Preferably, therefore, the person 732d is provided with means for reducing the number of slaughter animals supplied per unit time, for example by reducing the conveying speeds of the belt conveyors 730 and 710. In this connection, automatic regulation of the supply of slaughter animals is also conceivable, in which case the carousel conveyor 718 is equipped with a suitable detector for detecting the presence of slaughter animals on the carousel conveyor 718. If the detector detects that there are no slaughter animals on the carousel conveyor 718, the supply of slaughter animals can be increased to a specified maximum. However, as soon as the presence of slaughter animals on the carousel conveyor 718 is detected, the supply of slaughter animals is reduced, preferably in steps.

Figure 31:
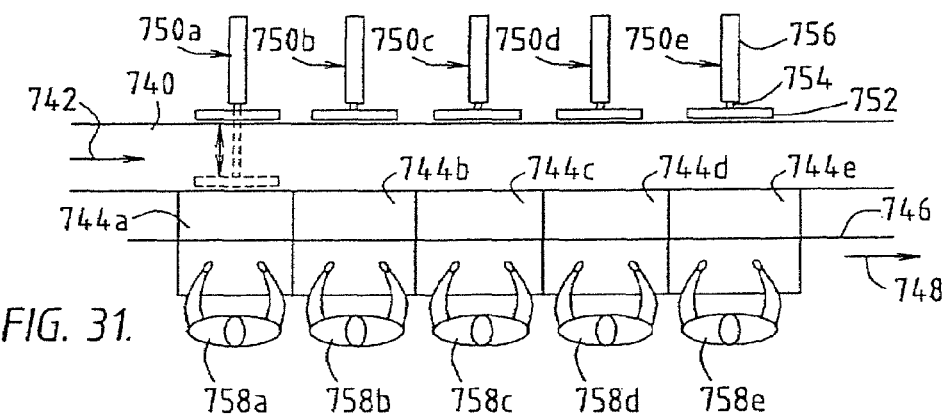
FIG. 31 shows a diagrammatic plan view of a sixth arrangement for hanging slaughter animals from hooks.

FIG. 31 shows a belt conveyor 740, the belt of which is driven, in a manner not shown in more detail, in the direction of arrow 742. A number of receptacles 744a-744d are arranged at a lower level next to the belt conveyor 740, above which receptacles hooks are moving, in an overhead conveyor 746, in the direction of arrows 748. On the other side of the belt conveyor 740, opposite each receptacle 744a-744d, there is a respective ejector mechanism 750a-750e, comprising an upright plate 752, which can be moved transversely over the belt conveyor 740 at a short distance above it and which is attached to a rod 754 of a piston-cylinder unit 756. At the ejector mechanism 750a, solid lines represent a starting position of the plate 752, while dashed lines indicate an ejection position.

The ejector mechanisms 750a-750e are used to push the slaughter animals which are supplied on the belt conveyor 740 into the respective receptacles 744a-744e, from which the slaughter animals are hung from hooks of the overhead conveyor 746 by respective people 758a-758e. The receptacles 744a-744e may each be provided with a suitable sensor, such as a weight sensor, on the basis of whose signal the associated ejector mechanism 750a-750e is actuated for ejecting slaughter animals from the belt conveyor 740 and maintain a certain filling level of the receptacles 744a-744e and/or a specified, preferably uniform distribution of the slaughter animals over the receptacles 744a-744e.

Figure 32:
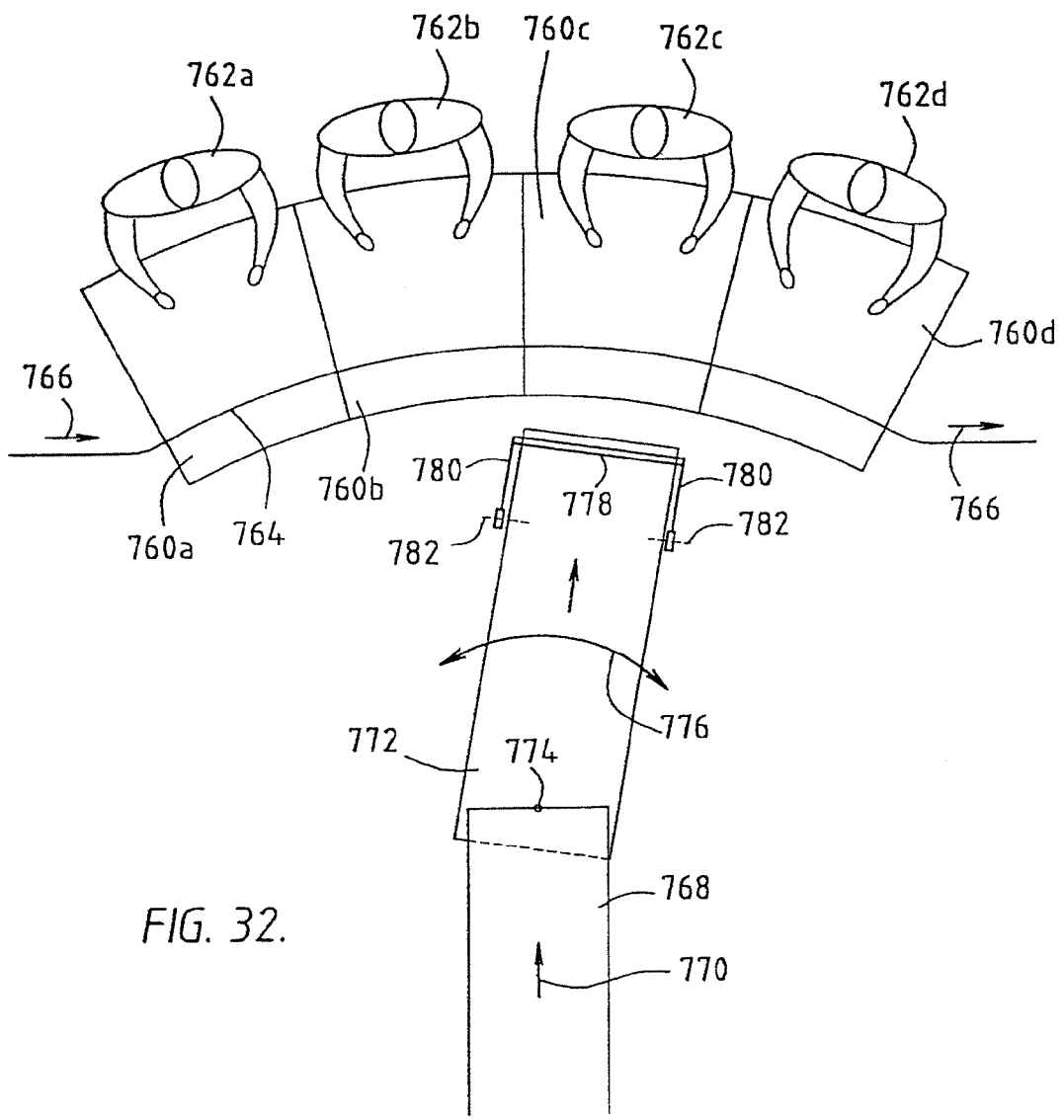
FIG. 32 shows a diagrammatic plan view of a seventh arrangement for hanging slaughter animals from hooks.

FIG. 32 shows four receptacles 760a-760d, at which people 762a-762d are standing. An overhead conveyor 764 in which hooks (not shown in more detail) are moving in the direction of arrows 766, runs above the receptacles. By means which are not shown in more detail, the belt of a belt conveyor 768 is driven in the direction of arrow 770. Beneath the downstream end of the belt conveyor 770 there is a sloping chute 772 which can be pivoted, in a controllable manner, about a pin 774, in the directions of double arrow 776, and the lowest end of which, in a predetermined pivot position, adjoins one of the receptacles 760a-760d.

At the lowest end of the chute 772, there is a raised wall 778 which is attached to pins 782 in such a manner that it can be pivoted in a controlled manner by means of arms 780. Thus the wall 778, in the position shown, can block slaughter animals which are supplied from the belt conveyor 768, and in an upwardly pivoted position can allow slaughter animals to pass through into one of the receptacles 760a-760d.

In a similar way to that explained in connection with FIG. 31, the receptacles 760a-760d in FIG. 32 may also be provided with weight sensors which are able to emit a signal, on the basis of which the supply of slaughter animals to the receptacles 760a-760d is regulated.

Figure 33:
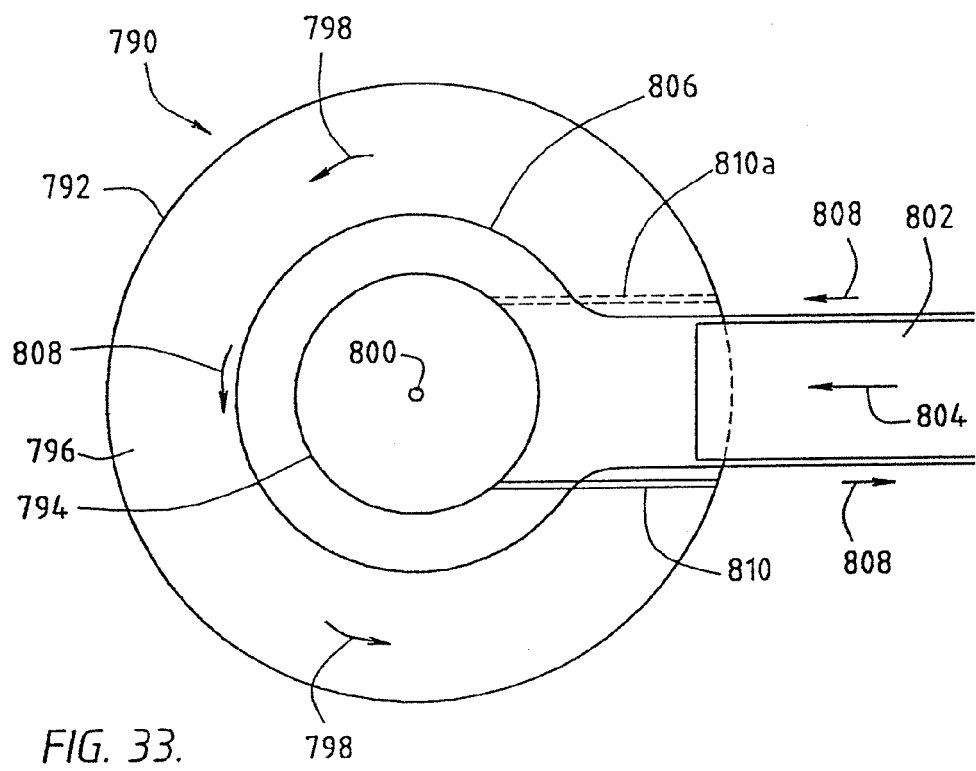
FIG. 33 shows a diagrammatic plan view of a first arrangement in carousel form for hanging slaughter animals from hooks.

FIG. 33 shows a carousel conveyor 790 with two raised walls 792, 794, between which an annular plate 796 is rotated about a pin 800 in the direction of arrows 798. Above the top edge of the raised wall 792 there is a belt conveyor 802, the belt of which moves in the direction of arrow 804. Above the carousel conveyor 790, there is an overhead conveyor 806, in which hooks (not shown in more detail) are moving in the direction of arrows 808. A partition 810 extends above the plate 796, between the walls 792 and 794.

Stunned or dead slaughter animals which are supplied on the belt conveyor 802 fall from the downstream end of the belt conveyor 802 onto the plate 796 of the carousel conveyor 790 and are thus conveyed onwards in the direction of the arrows 798 between the raised walls 792, 794 until they are blocked by the partition 810. People who hang the slaughter animals from the plate 796 in the hooks of the overhead conveyor 806 stand behind the raised wall 792.

If the direction of rotation 798 of the plate 796 is reversed, the partition 810 has to be displaced into the location 810a indicated by dashed lines. Both in the normal direction of rotation 798 and in the opposite direction of rotation, the partition 810 or 810a prevents slaughter animals from remaining in the carousel conveyor 790 for a prolonged period, since it will be obvious that slaughter animals which are located at the partition 810 or 810a have to be given priority for hanging from the hooks of the overhead conveyor 806. In the case of the partition 810a, with the hooks and the slaughter animals moving in "countercurrent flow", only empty hooks are located at the position of the partition 810a, which makes it easier to hang the slaughter animals at that location.

Figure 34:
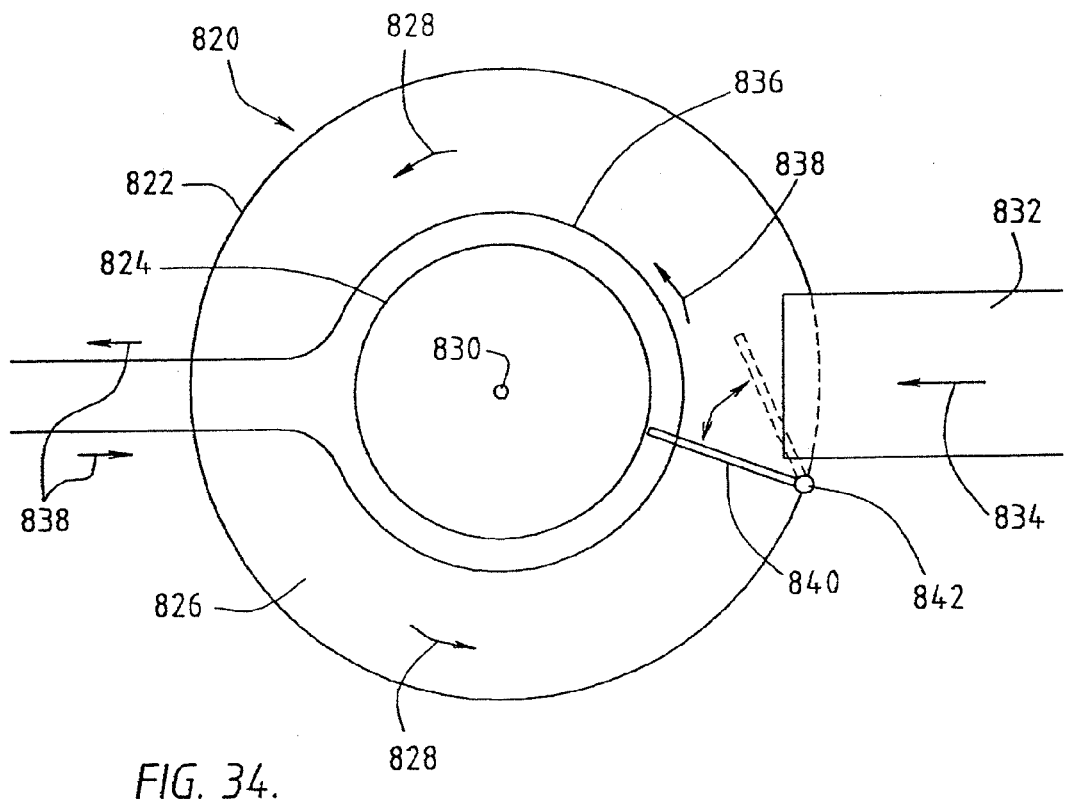
FIG. 34 shows a diagrammatic plan view of a second arrangement in carousel form for hanging slaughter animals from hooks.

FIG. 34 shows a carousel conveyor 820 with raised walls 822, 824 and an annular plate 826 which rotates about a pin 830 in the direction of arrows 828. A belt conveyor 832, the belt of which is moved, in a manner not shown in more detail, in the direction of arrow 834, is arranged above the top edge of the raised wall 822. Above the carousel conveyor 820 there is an overhead conveyor 836 in which hooks are moving in the direction of arrows 838. A partition 840 extends between the raised walls 822, 824, above the plate 826 of the carousel conveyor 820, which partition can pivot about a pin 842 into a position which is illustrated by dashed lines. People who pick up slaughter animals which have been supplied onto the plate 826 via the belt conveyor 832 and hang them from the hooks of the overhead conveyor 836 stand behind the raised wall 822.

Slaughter animals which, after they have completed virtually a complete circuit in the carousel conveyor 820, have not yet been hung from a hook come into contact with the partition 840, which pivots open when a certain pressure is exerted on it by slaughter animals, in order to allow these slaughter animals to pass through. At the same time, the fact that the partition 840 has pivoted open makes it possible to derive a signal that the supply of slaughter animals via the belt conveyor 832 should be interrupted for a brief period, so that it will be clearly apparent to the people around the carousel conveyor 820 which slaughter animals have been allowed to pass through the partition 840 (and therefore need to be given priority when hanging) and which slaughter animals are only on their first circuit through the carousel conveyor 820.

Figure 35:
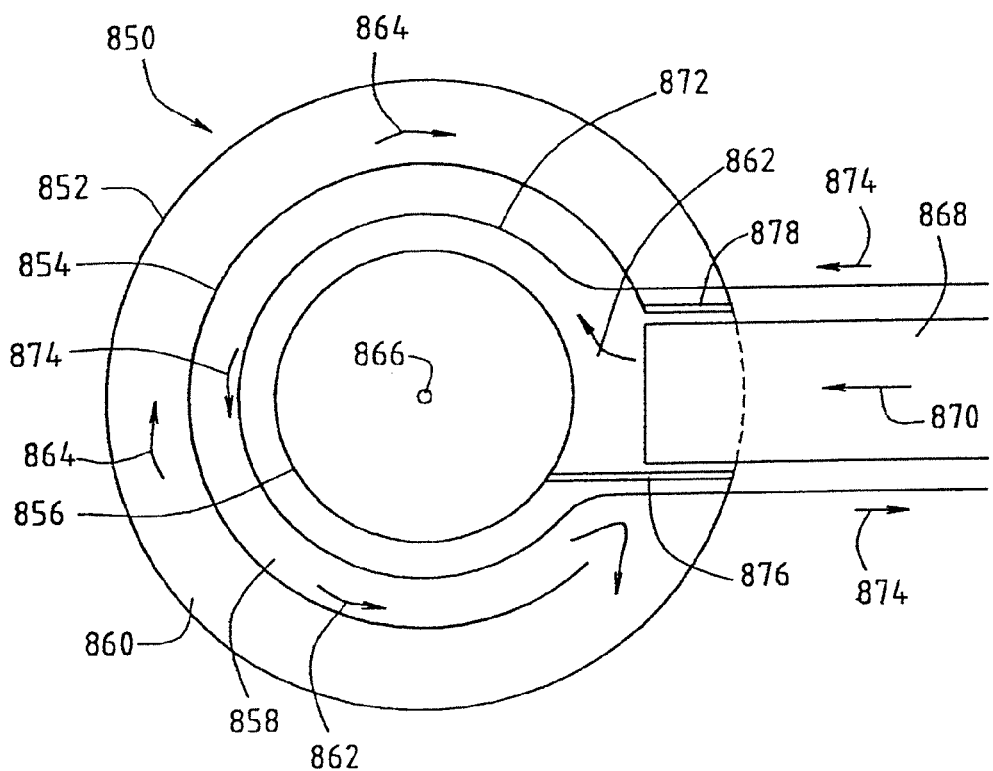
FIG. 35 shows a diagrammatic plan view of a third arrangement in carousel form for hanging slaughter animals from hooks.

FIG. 35 shows a carousel conveyor 850 with raised walls 852, 854 and 856, and two annular plates 858, 860, which are rotated in opposite directions 862 and 864, respectively, about a pin 866. Above the top edge of the raised wall 852 there is a belt conveyor 868, the belt of which is driven, by means which are not shown in more detail, in the direction of arrow 870. A partition 876 extends between the raised walls 852 and 856, above the plates 858, 860. A partition 878 extends between the raised walls 852 and 854, above the plate 860. Above the carousel conveyor 850 there is an overhead conveyor 872 in which hooks (not shown in more detail) are moving in the direction of arrows 874. Slaughter animals which are supplied onto the plate 858 by the belt conveyor 868, if they have not been hung from hooks, are firstly conveyed almost one circuit on the plate 858 between the raised walls 854 and 856, after which they are guided by the partition 876 onto the plate 860 and are conveyed between the raised walls 852 and 854 to the partition 878. Here, they will be given priority by the person at that location for hanging from the hooks of the overhead conveyor 872, and with this in mind this person has an unlimited number of free hooks available.

Figure 36:
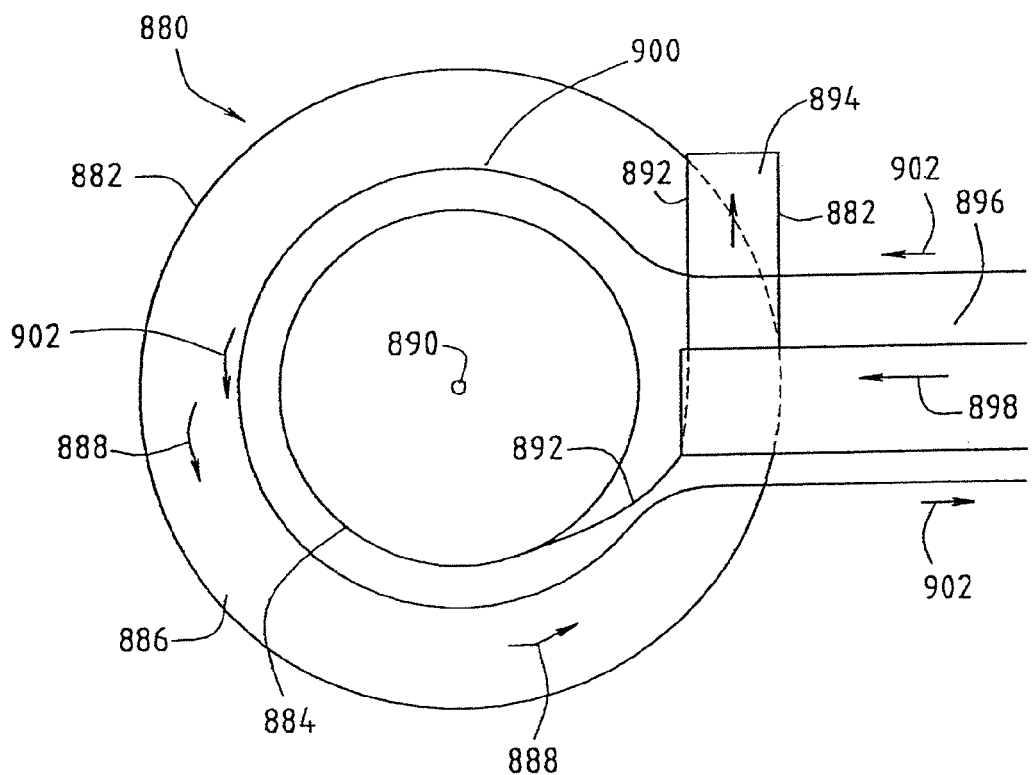
FIG. 36 shows a diagrammatic plan view of a fourth arrangement in carousel form for hanging slaughter animals from hooks.

FIG. 36 shows a carousel conveyor 880 with raised walls 882, 884, between which an annular plate 886 is rotated in the direction of arrows 888 about a pin 890. A raised wall 892 connects the raised wall 884 to the raised wall 882. A triangular plate 894 is arranged in a stationary position in the surface of the plate 886. Above the raised walls 882 and 892, there is a belt conveyor 896, the belt of which is moved, in a manner not shown in more detail, in the direction of arrow 898. Above the carousel conveyor, there is an overhead conveyor 900 in which hooks (not shown in more detail) are moving in the direction of arrows 902. People who hang slaughter animals which are present in the carousel conveyor 880 and are supplied via the belt conveyor 896 from hooks of the overhead conveyor 900 stand behind the raised wall 882. In this case, slaughter animals firstly reach the plate 886 and then—if they are not hung up immediately—pass through more than a full circuit on the plate 886 before they are guided between the raised walls 882 and 892 onto the plate 894. A person located at that location will give priority to hanging these slaughter animals from the hooks of the overhead conveyor 900, and with this in mind this person has an unlimited number of free hooks at his disposal.

It is important for slaughter animals to be hung up within a certain time of being stunned, so that they can be fed to an exsanguination device, in order to achieve a desired quality of exsanguination, and in view of the risk of a slaughter animal which has been stunned waking up before exsanguination has commenced. Even in the case of dead slaughter animals, they have to be hung up within a certain limited time in order to prevent an undesired loss of quality. It is therefore important to prevent slaughter animals from being able to or having to remain in a buffer store for an excessive time before they are hung up. Appropriate measures which ensure that this is so are provided in a number of the arrangements shown in FIG. 27 and subsequent figures.

In the Figures associated with this description, only those components which come into direct contact with the fowl are illustrated. Other components, such as a frame, actuators, etc. have been omitted for the sake of clarity and can in any case be designed in an obvious manner by the person skilled in the art.

While the invention has been particularly shown and described with reference to preferred embodiments, it will be understood by those skilled in the art that various changes in form and details may be made therein without departing from the spirit and scope of the invention.

What is claimed is:

1. A device for conveying slaughter fowl, the fowl comprising a head, neck, a body comprising a breast and shoulders, and legs, the device comprising:
   a first conveyor comprising at least one head carrier, wherein the head carrier is movable along a path of the first conveyor, wherein the first conveyor is adapted to engage the fowl only at its head, and wherein the first conveyor is adapted to convey the fowl while hanging in vertical orientation from the head carrier;

a second conveyor comprising at least one double hook movable along a path of the second conveyor, the double hook comprising openings each adapted to receive a leg of the fowl and to carry the fowl while hanging from its legs, a leg support positionable along the path of the first conveyor, a leg support drive, wherein the leg support is adapted to be moved between a substantially vertical position and a substantially horizontal position, independently of the head carrier, by the leg support drive;

wherein the leg support, when in the substantially vertical position, is adapted to contact at least the legs of the fowl as the fowl is hanging in vertical orientation from the head carrier of the first conveyor, wherein the leg support drive is adapted to move the leg support in contact with the legs of the fowl upward to the substantially horizontal position to position the legs of the fowl towards the double hook of the second conveyor, wherein the device is adapted to position the legs of the fowl while supported by the leg support in its horizontal position into the openings of the double hook; and wherein the device is adapted to move the leg support to its vertical position and to release the head of the fowl from the head carrier, causing the fowl to be hanging from its legs received in the openings of the double hook of the second conveyor.

2. The device of claim 1, wherein the leg support comprises a combined leg and breast support adapted to support both the legs and the breast of the fowl.

3. The device of claim 2, wherein the combined leg and breast support further comprises shoulder supports adapted to engage the shoulders of the fowl.

4. The device of claim 1, wherein the device further comprises a leg separating device adapted to separate the legs of the fowl to aid the positioning of the legs of the fowl with respect to the double hook.

5. The device of claim 4, wherein the leg separating device comprises a pivotable plate that is adapted to move between the legs of the fowl.

6. The device of claim 2, the device further comprising:

a first stop;

a first drive adapted to allow the first stop to move between an extended and retracted position, wherein the extended position is located at the rear of the fowl as said fowl is supported by the combined leg and breast support in a horizontal position;

a second stop; and a second drive adapted to allow the second stop to press against the breast of the fowl as said fowl is supported by the combined leg and breast support in a horizontal position, thereby pushing the rear of the fowl against the first stop irrespective of the size of the fowl.

7. A device for conveying slaughter fowl, each fowl having a head, neck, a body comprising breast and shoulders, and legs having drumsticks, the device comprising:

a first conveyor comprising at least one head carrier, wherein the head carrier is movable along a path of the first conveyor, wherein the first conveyor is adapted to engage the fowl only at its head, and wherein the first conveyor is adapted to convey the fowl while hanging in vertical orientation from the head carrier;

a second conveyor comprising at least one double hook movable along a path of the second conveyor, the double hook comprising openings each adapted to receive a leg of the fowl and to carry the fowl while hanging from its legs;

a rotatable leg gripper unit which is positionable in a receiving position along the path of the first conveyor, wherein the leg gripper unit is adapted to grip the drumsticks of the legs of the fowl as the fowl is hanging in vertical orientation from the head carrier of the first conveyor when the leg gripper unit is in the receiving position;

a leg gripper unit drive;

wherein the device is adapted to release the head of the fowl from the head carrier once the legs of the fowl have been gripped by the leg gripper unit, thereby causing the body of the fowl to fall, and wherein the leg gripper unit drive is adapted to rotate the leg gripper unit substantially at the same time as the fall of the fowl, such that the drumsticks of the legs are brought in a substantially horizontal position and the fowl is hanging vertically from the leg gripper unit, and wherein the leg gripper unit drive is adapted to subsequently move the fowl with its horizontally oriented drumsticks towards a double hook of the second conveyor and to place the legs in the openings of the double hook, and wherein the leg gripper unit is adapted to subsequently release the drumsticks and the leg gripper unit drive is adapted to further rotate the leg gripper unit, thereby causing the fowl to be hanging from its legs received in the openings of the double hook of the second conveyor.

* * * * *